(12) United States Patent
Kim et al.

(10) Patent No.: US 11,316,652 B2
(45) Date of Patent: Apr. 26, 2022

(54) METHOD AND APPARATUS FOR CONTROLLING PARTIAL FREQUENCY BAND IN WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Donggun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 16/651,938

(22) PCT Filed: Sep. 21, 2018

(86) PCT No.: PCT/KR2018/011327
§ 371 (c)(1),
(2) Date: Mar. 27, 2020

(87) PCT Pub. No.: WO2019/066438
PCT Pub. Date: Apr. 4, 2019

(65) Prior Publication Data
US 2020/0313832 A1 Oct. 1, 2020

(30) Foreign Application Priority Data
Sep. 27, 2017 (KR) .......................... 10-2017-0125059

(51) Int. Cl.
*H04L 5/00* (2006.01)
*H04W 24/10* (2009.01)
*H04W 72/04* (2009.01)

(52) U.S. Cl.
CPC ............ *H04L 5/0098* (2013.01); *H04L 5/001* (2013.01); *H04L 5/0094* (2013.01); *H04W 24/10* (2013.01); *H04W 72/042* (2013.01)

(58) Field of Classification Search
CPC ..... H04L 5/001; H04L 5/0098; H04L 5/0094; H04W 24/10; H04W 72/042
(Continued)

(56) References Cited

U.S. PATENT DOCUMENTS

2018/0183551 A1* 6/2018 Chou .................... H04L 5/0098
2019/0052432 A1* 2/2019 Islam .................... H04L 5/0094
(Continued)

FOREIGN PATENT DOCUMENTS

KR   10-2018-0016301 A   2/2018

OTHER PUBLICATIONS

InterDigital Inc., "CORESET Monitoring Under Dynamic Change of BWP", 3GPP TSG RAN WG1 NR Ad-Hoc #2, Jun. 27-30, 2017, R1-1710872, 5 pages.
(Continued)

*Primary Examiner* — Peter G Solinsky

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
One embodiment of the present invention relates to a method and an apparatus for processing data in a wireless communication system.

13 Claims, 18 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2019/0053029 A1* | 2/2019 | Agiwal | H04W 48/12 |
| 2019/0075585 A1* | 3/2019 | Deogun | H04W 72/1273 |
| 2019/0173533 A1 | 6/2019 | Kim et al. | |
| 2020/0037260 A1* | 1/2020 | Fu | H04L 27/2646 |
| 2020/0112976 A1* | 4/2020 | Lin | H04W 72/042 |
| 2020/0136878 A1* | 4/2020 | Yi | H04W 24/10 |
| 2020/0187236 A1* | 6/2020 | Moon | H04L 5/0053 |
| 2020/0280423 A1* | 9/2020 | Tang | H04L 29/06 |
| 2020/0367253 A1* | 11/2020 | Kim | H04W 72/0493 |
| 2021/0075581 A1* | 3/2021 | Takeda | H04W 72/042 |

OTHER PUBLICATIONS

Intel Corporation, "Remaining aspects for carrier aggregation and bandwidth parts", 3GPP TSG RAN WG1 Meeting NR#3, Sep. 18-21, 2017, R1-1716327, 7 pages.
Huawei, HiSilicon, "On bandwidth adaptation", 3GPP TSG RAN WG1 NR Ad-Hoc Meeting, Jun. 27-30, 2017, R1-1711424, 5 pages.
Intel Corporation, "Open issues for wider bandwidth operations", 3GPP TSG RAN WG1 NR Ad-Hoc#2, Jun. 27-30, 2017, R1-1710583, 7 pages.
Samsung, "Wider Bandwidth Operations", 3GPP TSG RAN WG1 NR Ad-Hoc#2, Jun. 27-30, 2017, R1-1710761, 8 pages.
International Search Report dated Jan. 4, 2019 in connection with International Patent Application No. PCT/KR2018/011327, 2 pages.
Written Opinion of the International Searching Authority dated Jan. 4, 2019 in connection with International Patent Application No. PCT/KR2018/011327, 6 pages.

* cited by examiner (a)

(b)

(c)

METHOD AND APPARATUS FOR CONTROLLING PARTIAL FREQUENCY BAND IN WIRELESS COMMUNICATION SYSTEM

CROSS-REFERENCE TO RELATED APPLICATIONS

This application is a 371 of International Application No. PCT/KR2018/011327 filed on Sep. 21, 2018, which claims priority to Korean Patent Application No. 10-2017-0125059 filed on Sep. 27, 2017, the disclosures of which are herein incorporated by reference in their entirety.

BACKGROUND

1. Field

The disclosure relates to a method for effectively controlling a bandwidth part in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

There has been ongoing research on various methods for effectively operating networks in NR mobile communication systems.

In accordance with an embodiment, a method of a UE in a wireless communication system may include: receiving, from a node B, a first message including, in connection with an initial bandwidth part (BWP), information regarding multiple BWPs and instruction information instructing activation of one of the multiple BWPs; determining, based on the instruction information, a first BWP among the multiple BWPs as an activated BWP; receiving a second message including information for switching the activated BWP from the first BWP to a second BWP among the multiple BWPs; and switching the activated BWP from the first BWP to the second BWP.

On the other hand, a method of a node B in a wireless communication system may include: transmitting, to a UE, a first message including, in connection with an initial bandwidth part (BWP), information regarding multiple BWPs and instruction information instructing activation of one of the multiple BWPs; and transmitting, if a first BWP among the multiple BWPs is determined by the UE as an activated BWP based on the instruction information, a second message including information for switching the activated BWP from the first BWP to a second BWP among the multiple BWPs, wherein the activated BWP is switched from the first BWP to the second BWP by the UE that has received the second message.

On the other hand, a UE in a wireless communication system may include: a transceiver; and a controller configured to control the transceiver so as to receive, from a node B, a first message comprising, in connection with an initial bandwidth part (BWP), information regarding multiple BWPs and instruction information instructing activation of one of the multiple BWPs, the controller being configured to determine, based on the instruction information, a first BWP among the multiple BWPs as an activated BWP, configured to control the transceiver so as to receive a second message comprising information for switching the activated BWP from the first BWP to a second BWP among the multiple BWPs, and configured to conduct control such that the activated BWP is switched from the first BWP to the second BWP.

On the other hand, a node B in a wireless communication system may include: a transceiver; and a controller configured to control the transceiver so as to transmit, to a UE, a first message including, in connection with an initial bandwidth part (BWP), information regarding multiple BWPs and instruction information instructing activation of one of the multiple BWPs, and to transmit a second message, if a first BWP among the multiple BWPs is determined by the UE as an activated BWP based on the instruction information, the second message including information necessary for the UE to switch the activated BWP from the first BWP to a second BWP among the multiple BWPs, wherein the activated BWP is switched from the first BWP to the second BWP by the UE that has received the second message.

According to an embodiment, NR mobile communication systems can be operated effectively.

DETAILED DESCRIPTION

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Terms for identifying access nodes, terms denoting network entities, terms denoting messages, terms denoting interfaces between network entities, terms denoting various kinds of identification information, and the like, used in the following description, are examples for facilitating the description. Accordingly, the disclosure is not limited to the terms described below, and different terms may be used to denote entities having the same technical meanings.

Hereinafter, the disclosure will be described, for convenience of description, by using terms and names defined by specifications of the 3rd generation partnership project long term evolution (3GPP LTE), which is the most recent among currently existing communication standards. However, the disclosure is not limited to the above terms and names, and is equally applicable to systems following other standards. Particularly, the disclosure is applicable to 3GPP new radio (NR: 5th generation mobile communication standard).

First Embodiment

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Figure 1A:
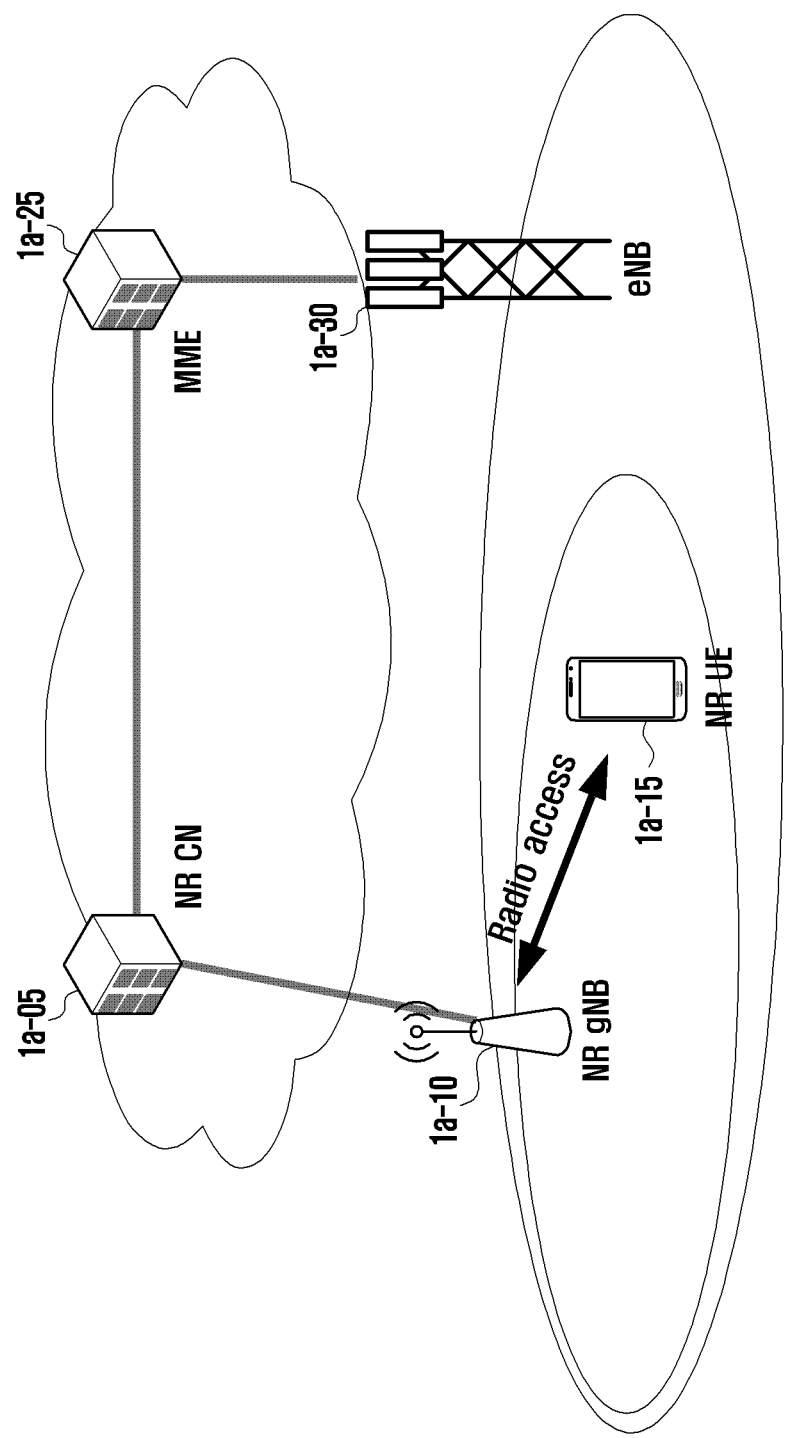
FIG. 1A is a diagram illustrating the structure of a NR mobile communication system.

FIG. 1A is a diagram illustrating the structure of a NR mobile communication system.

Referring to FIG. 1A, the radio access network of the NR mobile communication system includes, as illustrated, a new radio node B (hereinafter, referred to as NR NB) 1a-10 and an new radio core network (NR CN) 1a-05. The new radio user equipment (hereinafter, referred to as NR UE or UE) 1a-15 accesses an external network through the NR NB 1a-10 and the NR CN 1a-05.

In FIG. 1A, the NR NB 1a-10 corresponds to an evolved node B (eNB) of an existing LTE system. The NR NB is connected to the NR UE 1a-15 through a radio channel, and may provide a better service than any existing node B. Since all user traffic is provided through a shared channel in the NR mobile communication system, a device for aggregating and scheduling state information of the UEs, such as the buffer state, the available transmission power state, and the channel state, is necessary, and the NR NB 1a-10 is in charge thereof. A single NR NB normally controls multiple cells. In order to implement high-speed data transmission compared with the existing LTE, the NR NB may have a maximum bandwidth equal to or larger than the existing one, may employ orthogonal frequency division multiplexing (hereinafter, referred to as OFDM) as a radio access technology, and may additionally employ a beamforming technology in combination. In addition, the modulation scheme and the channel coding rate are determined according to the UE's channel state (that is, adaptive modulation & coding (hereinafter, referred to as AMC) scheme is applied). The NR CN 1a-05 performs functions such as mobility support, bearer configuration, and QoS configuration. The NR CN is a device handling not only a mobility management function regarding the UE, but also various control functions, and is connected to multiple nodes B. In addition, the NR mobile communication system may interwork with an existing LTE system, and the NR CN is connected to an MME 1a-25 through a network interface. The MME is connected to an eNB 1a-30 (existing node B).

Figure 1B:
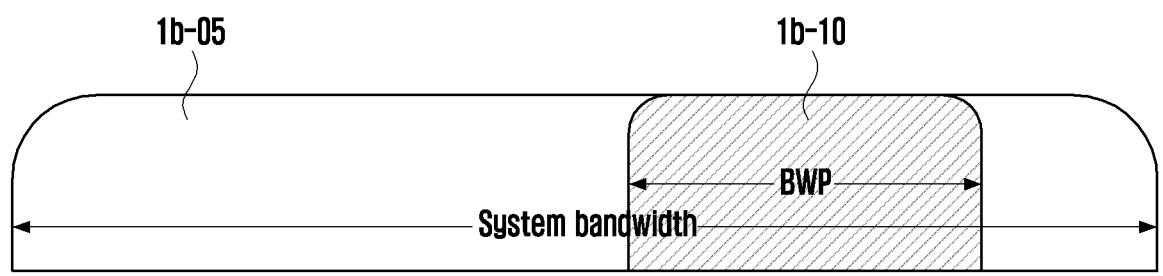
FIG. 1B is a diagram illustrating a scenario in which a bandwidth part is applied in a NR communication system.
Figure 1B:
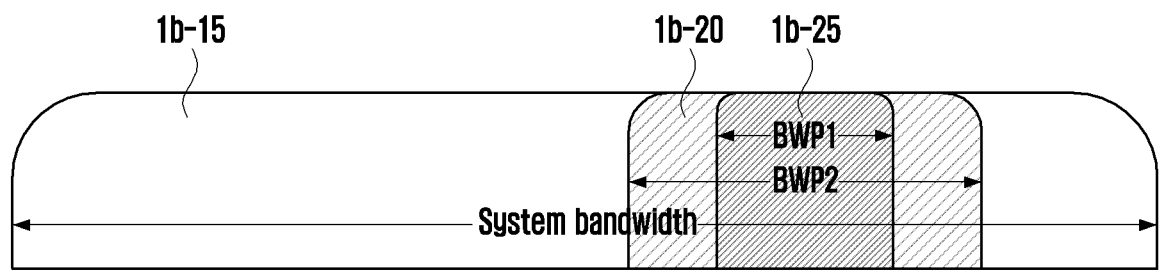
Figure 1B:
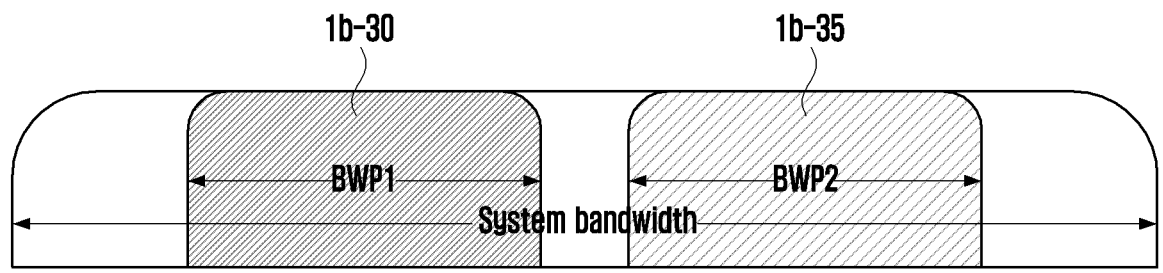

FIG. 1B is a diagram illustrating a scenario in which a bandwidth part is applied in a NR communication system.

A bandwidth part (BWP) application technology refers to communication performed by a single UE by using only a part of a system bandwidth used by a single cell. The BWP is used for the purpose of reducing UE manufacturing costs or saving power consumed by the UE. The BWP may be configured by a node B only for a UE that supports the same.

Referring to FIG. 1B, three types of BWP operating scenarios exist.

As illustrated in (a) of FIG. 1B, according to the first scenario, the BWP is applied for a UE that supports only a bandwidth 1b-10 smaller than the system bandwidth 1b-05 used by a single cell. In order to reduce manufacturing costs, a specific UE may be developed to support a limited bandwidth. The UE needs to report to the node B that only the limited bandwidth is supported, and the node B accordingly configures the maximum bandwidth supported by the UE or a BWP equal to or smaller than the same.

As illustrated in (b) of FIG. 1B, according to the second scenario, the BWP is applied for the purpose of reducing power consumed by the UE. For example, a UE has been conducting communication by using the entire system bandwidth 1b-15 used by a single cell or a BWP 1b-20 thereof, but the communication node B may configure a smaller bandwidth 1b-25 for the purpose of power saving.

As illustrated in (c) of FIG. 1B, according to the third scenario, individual BWPs are applied according to different numerologies. As used herein, "numerology" refers to diversifying the physical layer configuration in order to implement optimal data transmission according to various service requirements. For example, in the case of an OFDMA structure including multiple subcarriers, the spacing between subcarriers may be variably adjusted according to a predetermined requirement. A single UE may simultaneously apply multiple numerologies to conduct communication. Since different physical layer configurations corresponds to respective numerologies, it is preferred to separately apply respective numerologies with regard to individual BWPs 1b-35 and 1b-40.

The disclosure proposes a method for configuring and changing the BWP. Since each UE can support a different bandwidth, a BWP that all UEs can apply needs to be used for communication during the initial access, and a BWP for a specific UE is applied from a predetermined timepoint. The applied BWP can be changed through predetermined signaling, and a BWP to be applied in a target cell during a handover is indicated to the UE through predetermined signaling.

Figure 1C:
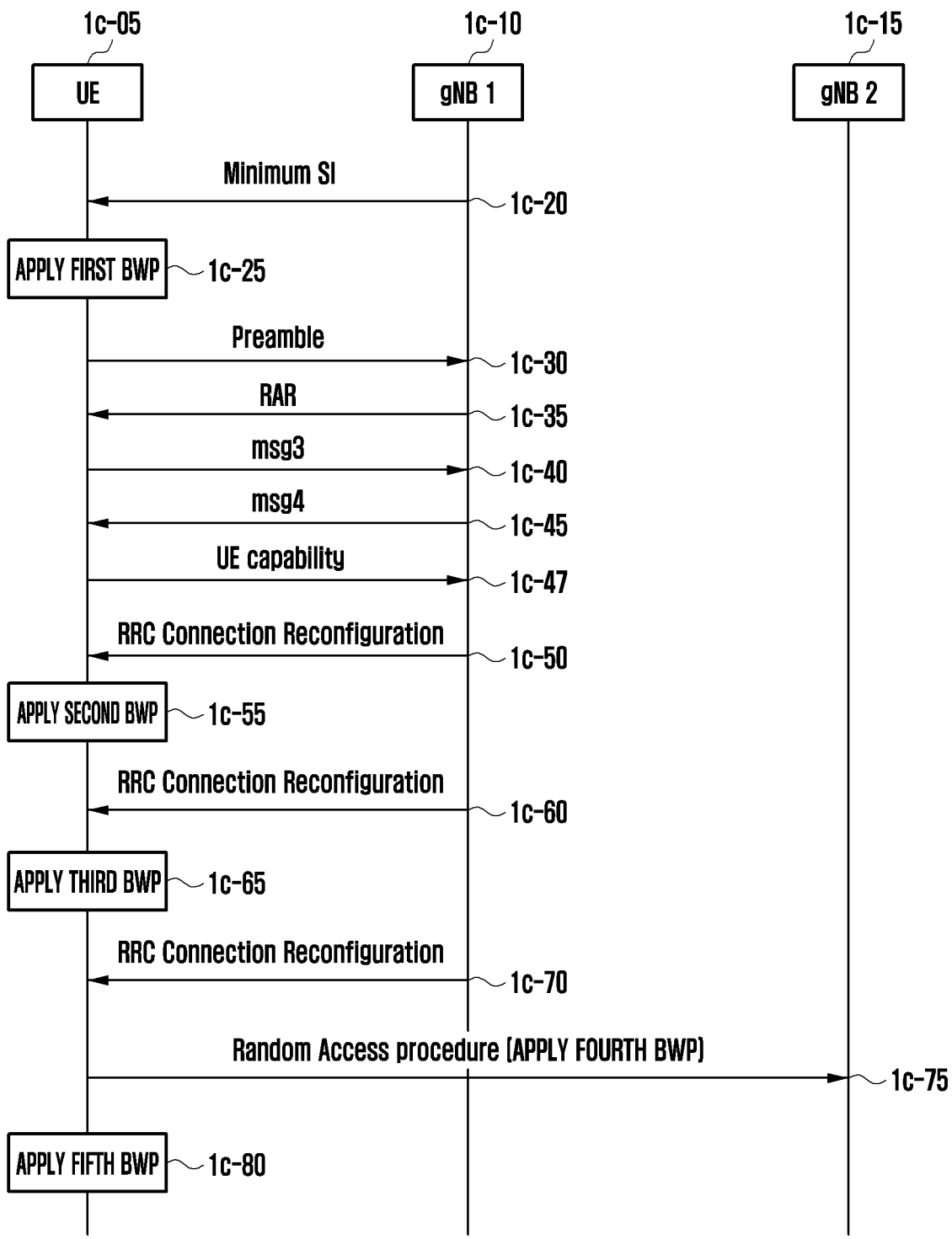
FIG. 1C is a flowchart illustrating processes for changing a bandwidth part applied by a UE in the disclosure.

FIG. 1C is a flowchart illustrating processes for changing a bandwidth part applied by a UE in the disclosure.

The UE 1c-05 receives minimum system information (MSI) broadcast by a node B 1c-10 in a specific frequency position (1c-20). For example, the MSI may be broadcast through n center physical resource blocks in the system bandwidth used by the cell. The MSI is broadcast periodically in a predetermined radio resource position, and includes indispensable information necessary to camp on the cell or necessary for the initial access. In the disclosure, the MSI includes configuration information of a first BWP that is applied for the initial access. The BWP configuration information includes center frequency/frequency bandwidth information and random access radio resource information. The center frequency/bandwidth information may be indicated separately with regard to the uplink and the downlink. The random access radio resource needs to exist at least within the frequency bandwidth. The frequency bandwidth information may be indicated in terms of the number of PRBs or in a Hz unit. As another example, the first BWP downlink configuration information may follow that of the MSI. In this case, the MSI may not need to separately include first BWP configuration information, or includes only uplink-related frequency information and random access radio resource information.

Multiple BWPs that are applicable for the initial access, such as the first BWP may exist inside a cell. The node B provides configuration information regarding the multiple BWPs as system information. Then, the UE needs to select one BWP therefrom. For the purpose of alleviating the congestion phenomenon, the UE selects one BWP according to a predetermined rule. For example, UE_ID is used to select one from the multiple BWPs. The UE has a single UE-ID value, and a single index value is derived if the UE_ID is substituted in a predetermined formula. The multiple BWPs have a one-to-one correspondence with a single index. Therefore, the UE selects a single BWP corresponding to the derived index value. The UE_ID is obtained through a module operation by using a specific number as the international mobile subscribe identify (IMSI), which is one of identifiers corresponding to the UE. Specifically, a formula is derived in the format: UE_ID=IMSI mode N. In this regard, the IMSI is a unique identifier indicating the LTE user, and is defined as a combination of multiple pieces of information (MCC+MNC+MSIN, wherein MCC refers to a nation code, MNC refers to a business provider code, and MSIN refers to a user code), and N is a specific positive integer. As another example, the UE randomly derives a single index value. The multiple BWPs have a one-to-one correspondence with a single index. Therefore, the UE selects a single BWP corresponding to the derived index value.

The UE applies the first BWP (1c-25), thereby performing the subsequent procedure. The subsequent procedure refers to a random access procedure and predetermined control message reception. The random access process includes transmitting a preamble to the node B (1c-30), transmitting a random access response message (RAR) to the UE (1c-35), transmitting an msg3 message to the node B (1c-40), and transmitting an msg4 message to the UE (1c-45). The UE transmits the preamble by using a random access radio resource provided by the MSI. After transmitting the preamble, the UE monitors whether or not a RAR corresponding to the preamble is transmitted for a predetermined time interval. If the RAR is successfully received, the UE transmits an msg3 message by using a radio resource indicated by the RAR. The UE receives an msg4 within a predetermined time, and finally determines whether or not the attempted random access is successful. All radio resources used to transmit/receive the above messages need to exist at least within the first BWP.

While performing the random access or immediately after successfully completing the same, the UE reports its capability information to the node B by still using the first BWP (1c-47). The capability information includes information regarding the maximum frequency bandwidth that the UE can support. In addition, the UE receives a predetermined RRC control message from the node B by using the first BWP (1c-50). The message includes second BWP configuration information. The BWP configuration information includes central frequency/frequency bandwidth information, and each piece of information may be indicated with regard to the uplink and the downlink. In this case, the frequency bandwidth does not exceed the maximum frequency bandwidth included in the UE's capability information. Moreover, the UE receives an indicator that activates the second BWP. If the UE supports multiple numerologies, and if the node B wants to configure a BWP for each numerology, the RRC control message includes configuration information regarding multiple BWPs. The BWPs may move the center frequency at a predetermined time interval according to a predetermined pattern while maintaining the same bandwidth. This is referred to as frequency hopping, and the configuration information may include the pattern information and information indicating whether or not the same is performed. The indicator that activates the second BWP may be included together in the control message, or may be included in a control message that is triggered in the MAC layer, which is lower than the RRC layer. The MAC control message is contained in a MAC PDU as a MAC control element (CE). As another example, whether or not activation occurs may be indicated by implicitly containing second BWP configuration information in the RRC control message. After receiving the second BWP configuration information, the UE switches from the first BWP to the second BWP at a predetermined timepoint (1c-55). For example, the timepoint refers to a time immediately after the RRC control message is completely processed if the uplink HARQ ACK/NACK transmission radio resource in the first BWP and the HARQ ACK/NACK transmission radio resource in the second BWP are identical (or if PUCCH configurations are identical), or refers to a time after a HARQ ACK regarding the RRC control message is transmitted if the two HARQ ACK/NACK transmission radio resources are changed.

The terminal may switch, in a connected mode, from the second BWP to a different third BWP. The second and third BWPs differ from each other in terms of at least one of the center frequency and the frequency bandwidth. The third BWP configuration information is provided to the UE in advance as an RRC control message (1c-60). The UE receives downlink control information (DCI) that instructs BWP switching, and then switches to the third BWP after k symbols or after a predetermined time passes (1c-65). The DCI is contained in the control channel by L1 signaling. The UE may also perform a random access in the third BWP for the purpose of uplink synchronization. Whether or not to perform the random access may be instructed by the node B, may be performed always, or may be performed based on a determination made by the UE if a predetermined condition is satisfied. For example, the condition is that the distance of spacing between the center frequencies of the second and third BWPs will be equal to or less than a predetermined threshold.

The UE may hand over to an adjacent cell. If the source cell determines a handover related to the UE, the same provides the target cell with configuration information regarding the UE. The configuration information includes information regarding BWP capability supported by the UE, or configuration information of the BWP currently applied to the UE. In view of the information, the target cell delivers configuration information of the BWP, which is to be applied in the target cell by the UE, to the source cell. After receiving the configuration information, the source cell transmits the same to the UE by using an RRC control message (1c-70). The frequency bandwidth of the BWP to be applied to the target cell cannot exceed the BWP capability supported by the UE. In addition, the BWP to be applied to the target cell may be divided into a fourth BWP for a random access in the target cell (1c-75) and a fifth BWP that is applied after the random access (1c-80).

In the disclosure, the first and fourth BWPs are for the purpose of initial access, while the second, third, and fifth BWPs are dedicated BWPs for a specific UE. Configuration information of a BWP, which is provided to the UE, may differ slightly according to the purpose of the BWP.

The BWP configuration information, which is for the purpose of initial access, includes uplink configuration information and downlink configuration information. Specifically, the downlink configuration information includes CORESET configuration information including an absolute radio frequency channel number (ARFCN) that specifies the center frequency, a frequency bandwidth that is indicated in terms of the number of PRBs or in a Hz unit, and frequency/time information. The COREET corresponds to the PDCCH in the existing LTE technology, and is used to provide control information such as PDSCH scheduling information. The frequency information in the CORESET configuration information refers to the frequency bandwidth through which the CORESET is transmitted, and the frequency offset (the number of the first PRB). The time information in the CORESET configuration information refers to information regarding the symbol number or the time offset and the period. On the other hand, the uplink configuration information includes an ARFCN that specifies the center frequency, a frequency bandwidth that is indicated in terms of the number of PRBs or in a Hz unit, and PUCCH configuration information. If the center frequency of the uplink is identical to that of the downlink, or is spaced apart by a fixed distance, the uplink center frequency information may be omitted. In addition, the uplink frequency bandwidth may be omitted, if the same is identical to that of the downlink. For example, in the case of a TDD, the uplink and downlink have the same center frequency and bandwidth, and overlapping information in the configuration information may thus be omitted. Instead, an indicator that indicates a TDD BWP or TDD configuration information (DL, UL pattern, or the like) may be included in the BWP configuration information.

Identically, configuration information of a dedicated BWP includes uplink configuration information and downlink configuration information. Specifically, the downlink configuration information includes a common search space (CSS) indicator and CORESET configuration information including the ID of the corresponding BWP, the numerology ID (may be omitted if identical to the initial access BWP), an ARFCN that specifies the center frequency or a frequency offset, a frequency bandwidth that is indicated in terms of the number of PRBs or in a Hz unit, and frequency/time information. The CSS indicator is configured as "No" if s UE-specific search space (USS) solely exists, and is configured as "Yes" if the CSS and the USS exist together. On the other hand, the uplink configuration information includes an ARFCN that specifies the center frequency, a frequency bandwidth that is indicated in terms of the number of PRBs or in a Hz unit, and PUCCH configuration information. Likewise, if the uplink and the downlink have the same enter frequency and bandwidth, overlapping information in the configuration information may be omitted.

Figure 1D:
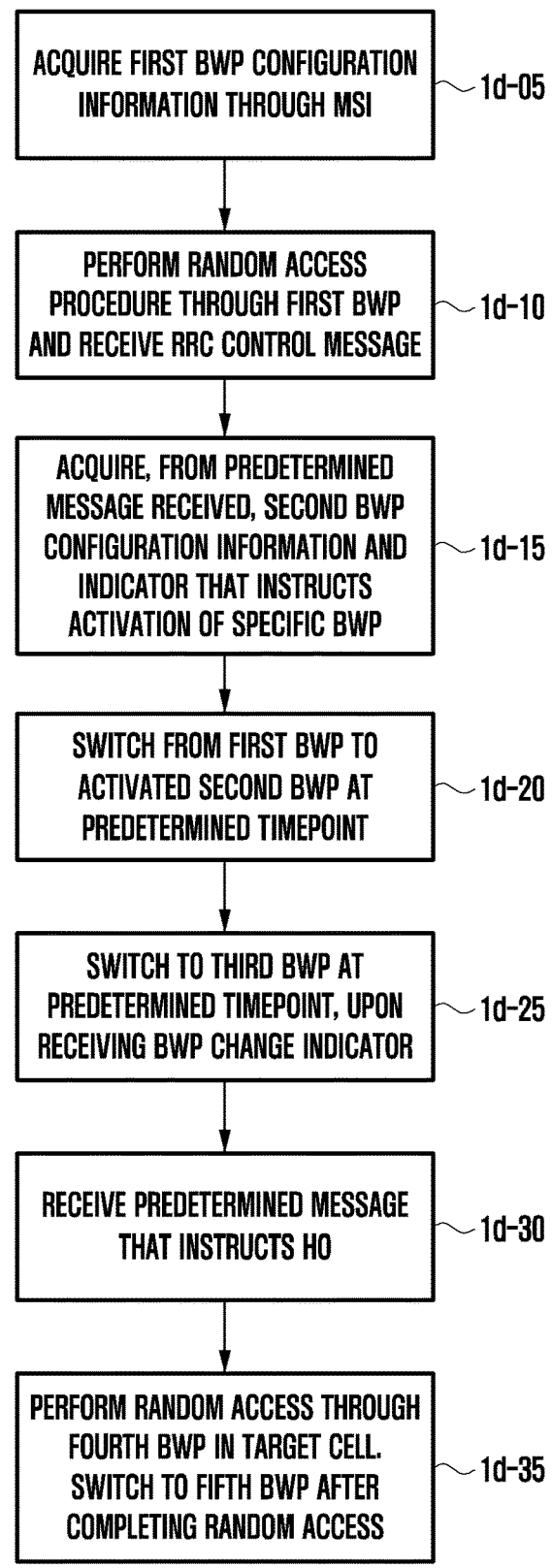
FIG. 1D is a flowchart illustrating UE operations for changing a bandwidth part applied by a UE in the disclosure.

FIG. 1D is a flowchart illustrating UE operations for changing a bandwidth part applied by a UE according to another embodiment.

In step 1d-05, the UE acquires first BWP configuration information through MSI. In step 1d-10, the UE performs a random access procedure through a first BWP, and receives a predetermined RRC control message. In step 1d-15, the UE acquires, from the predetermined message received, second BWP configuration information and an indicator that indicates activation of a specific BWP. In step 1d-20, the UE switches from the first BWP to an activated second BWP at a predetermined timepoint. In step 1d-25, the UE switches to a third BWP at a predetermined timepoint, upon receiving a BWP change indicator. In step 1d-30, the UE receives a predetermined message that instructs a HO. The UE acquires, from the message, configuration information of a BWP to be applied in a target cell. According to the purpose, multiple BWPs may be provided. In step 1d-35, the UE performs a random access through a fourth BWP in the target cell, and switches to a fifth BWP after completing the random access.

Figure 1E:
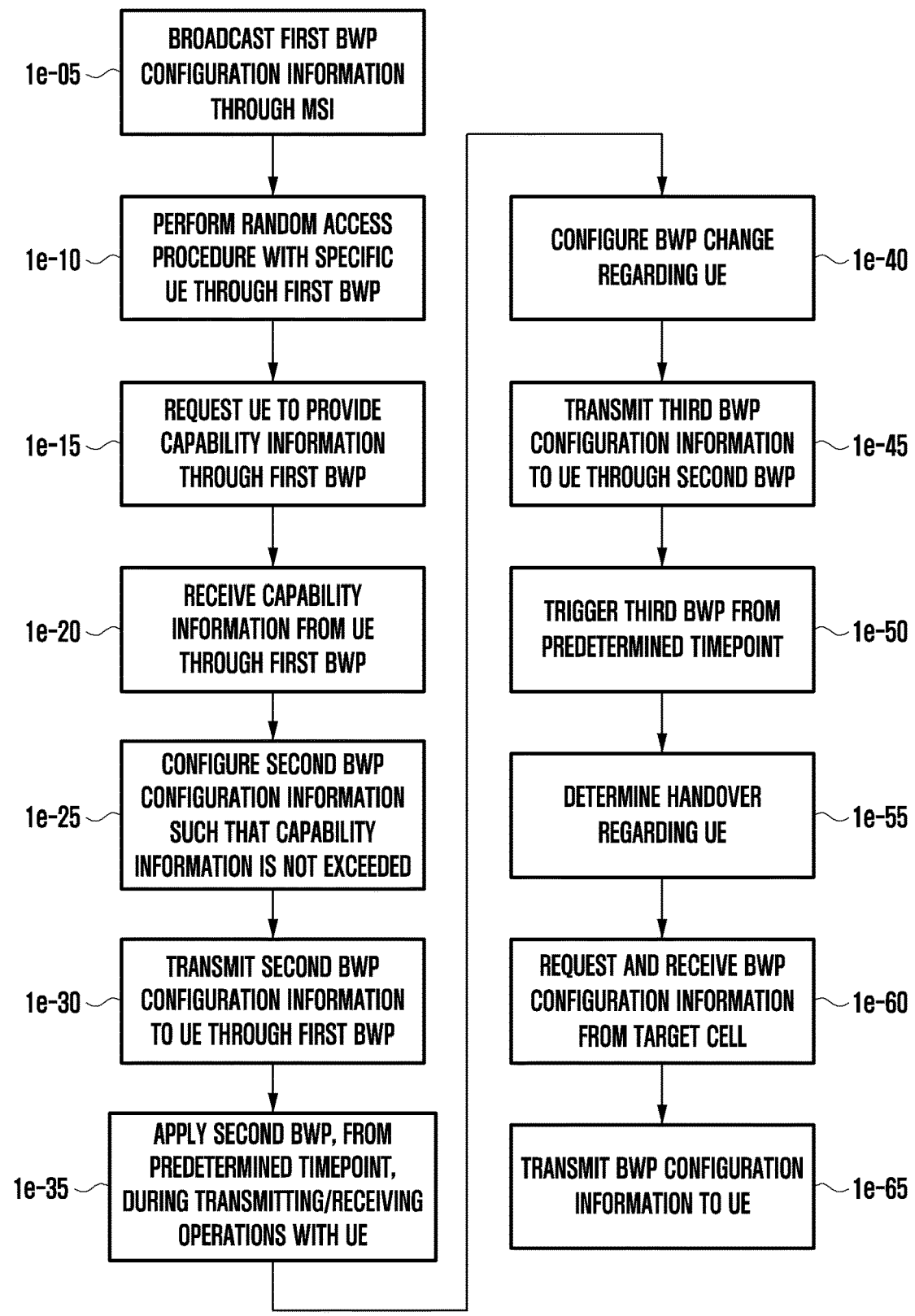
FIG. 1E is a flowchart illustrating node B operations for changing a bandwidth part applied by a UE in the disclosure.

FIG. 1E is a flowchart illustrating node B operations for changing a bandwidth part applied by a UE in the disclosure.

In step 1e-05, the node B broadcasts first BWP configuration information through MSI. In step 1e-10, the node B performs a random access procedure with a specific UE through a first BWP. In step 1e-15, the node B requests the UE to provide capability information through the first BWP. In step 1e-20, the node B receives capability information from the UE through the first BWP. In step 1e-25, the node B configures second BWP configuration information such that the capability information is not exceeded. In step 1e-30, the node B transmits the second BWP configuration information to the UE through the first BWP. In step 1e-35, the node B applies the second BWP, from a predetermined timepoint, during transmitting/receiving operations with the UE. In step 1e-40, the node B determines a BWP change regarding the UE. In step 1e-45, the node B transmits third BWP configuration information to the UE through the second BWP. In step 1e-50, the node B applies the third BWP from a predetermined timepoint. In step 1e-55, the node B determines a handover regarding the UE. In step 1e-60, the node B requests and receives BWP configuration information from the target cell. In step 1-65, the node B transmits the BWP configuration information to the UE.

Figure 1F:
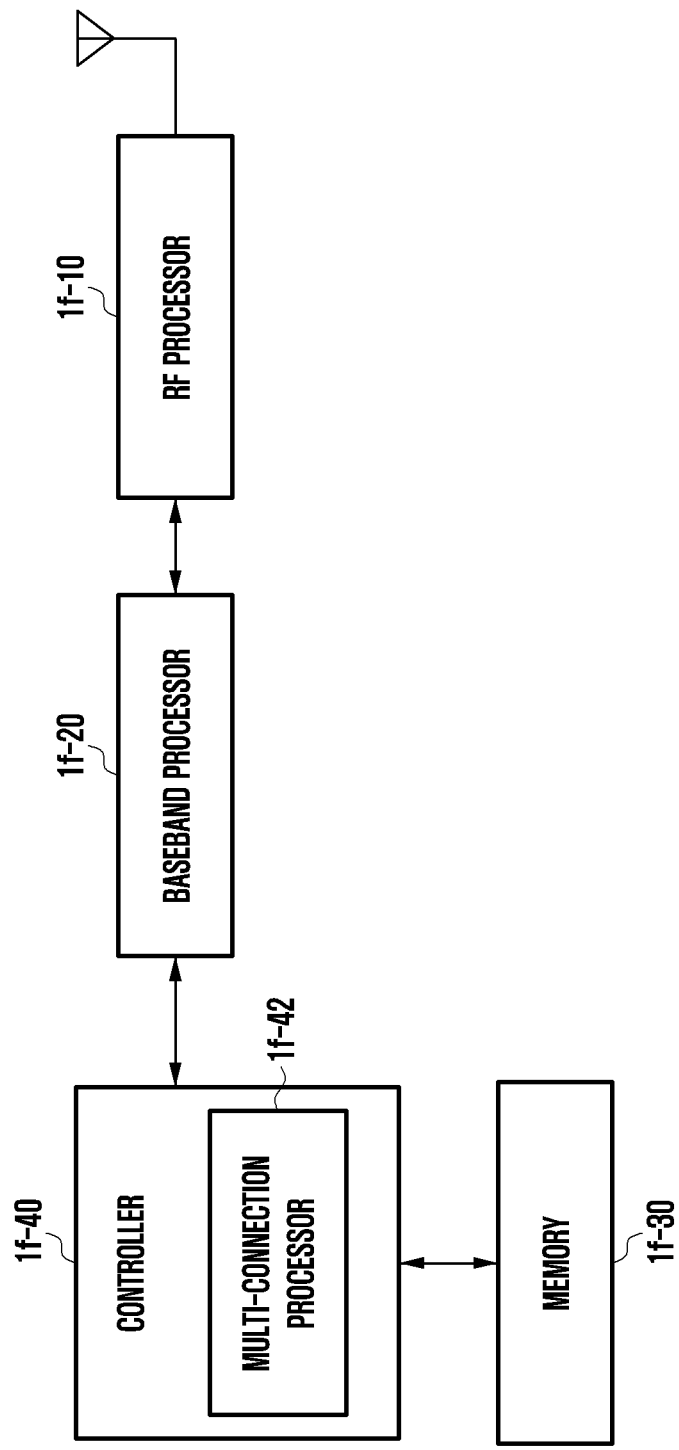
FIG. 1F is a block diagram illustrating the internal structure of a UE to which the disclosure is applied.

FIG. 1F illustrates the structure of a UE.

Referring to the diagram, the UE includes a radio frequency (RF) processor 1f-10, a baseband processor 1f-20, a storage unit 1f-30, and a controller 1f-40.

The RF processor 1f-10 is configured to perform functions for transmitting/receiving signals through a radio channel, such as signal band conversion and amplification. That is, the RF processor 1f-10 up-converts a baseband signal provided from the baseband processor 1f-20 to an RF band signal, transmits the same through an antenna, and down-converts an RF band signal received through the antenna to a baseband signal. For example, the RF processor 1f-10 may include a transmitting filter, a receiving filter, an amplifier, a mixer, an oscillator, a digital-to-analog convertor (DAC), an analog-to-digital convertor (ADC), and the like. Although only one antenna is illustrated in the diagram, the UE may include multiple antennas. In addition, the RF processor 1f-10 may include multiple RF chains. Moreover, the RF processor 1f-10 may perform beamforming. For the purpose of beamforming, the RF processor 1f-10 may adjust the phase and magnitude of respective signals transmitted/received through multiple antennas or antenna elements. In addition, the RF processor may perform MIMO, and may receive multiple layers when performing the MIMO operation.

The baseband processor 1f-20 is configured to perform a function for conversion between a baseband signal and a bit string according to the physical layer specification of the system. For example, during data transmission, the baseband processor 1f-20 generates complex symbols by encoding and modulating a transmission bit string. In addition, during data reception, the baseband processor 1f-20 restores a reception bit string by demodulating and decoding a baseband signal provided from the RF processor 1f-10. For example, if an orthogonal frequency division multiplexing (OFDM) scheme is followed, and during data transmission, the baseband processor 1f-20 generates complex symbols by encoding and modulating a transmission bit string, maps the complex symbols to subcarriers, and then configures OFDM symbols through inverse fast Fourier transform (IFFT) operation and cyclic prefix (CP) insertion. In addition, during data reception, the baseband processor 1f-20 divides a baseband signal provided from the RF processor 1f-10 symbol by symbol, restores signals mapped to subcarriers through a fast Fourier transform (FFT) operation, and then restores the reception bit string through demodulation and decoding.

The baseband processor 1f-20 and the RF processor 1f-10 transmit and receive signals as described above. Accordingly, the baseband processor 1f-20 and the RF processor 1f-10 may be referred to as transmitting units, receiving units, transceivers, or communication units. Furthermore, at least one of the baseband processor 1f-20 and the RF processor 1f-10 may include multiple communication modules to support multiple different radio access technologies. In addition, at least one of the baseband processor 1f-20 and the RF processor 1f-10 may include different communication modules in order to process signals in different frequency bands. For example, the different radio access technologies may include a wireless LAN (for example, IEEE 802.11), a cellular network (for example, LTE), and the like. In addition, the different frequency bands may include a super-high frequency (SHF) (for example, 2.5 GHz or 2 GHz) band and a millimeter wave (for example, 60 GHz) band.

The storage unit 1f-30 is configured to store data for operations of the UE, such as basic programs, application programs, and configuration information. Particularly, the storage unit 1f-30 may store information regarding a second access node configured to perform wireless communication by using a second radio access technology. In addition, the storage unit 1f-30 provides stored data at the request of the controller 1f-40.

The controller 1f-40 is configured to control overall operations of the UE. For example, the controller 1f-40 transmits/receives signals through the baseband processor 1f-20 and the RF processor 1f-10. In addition, the controller 1f-40 records and reads data in the storage unit 1f-40. To this end, the controller 1f-40 may include at least one processor. For example, the controller 1f-40 may include a communication processor (CP) configured to perform control for communication and an application processor (AP) configured to control an upper layer, such as an application program.

Figure 1G:
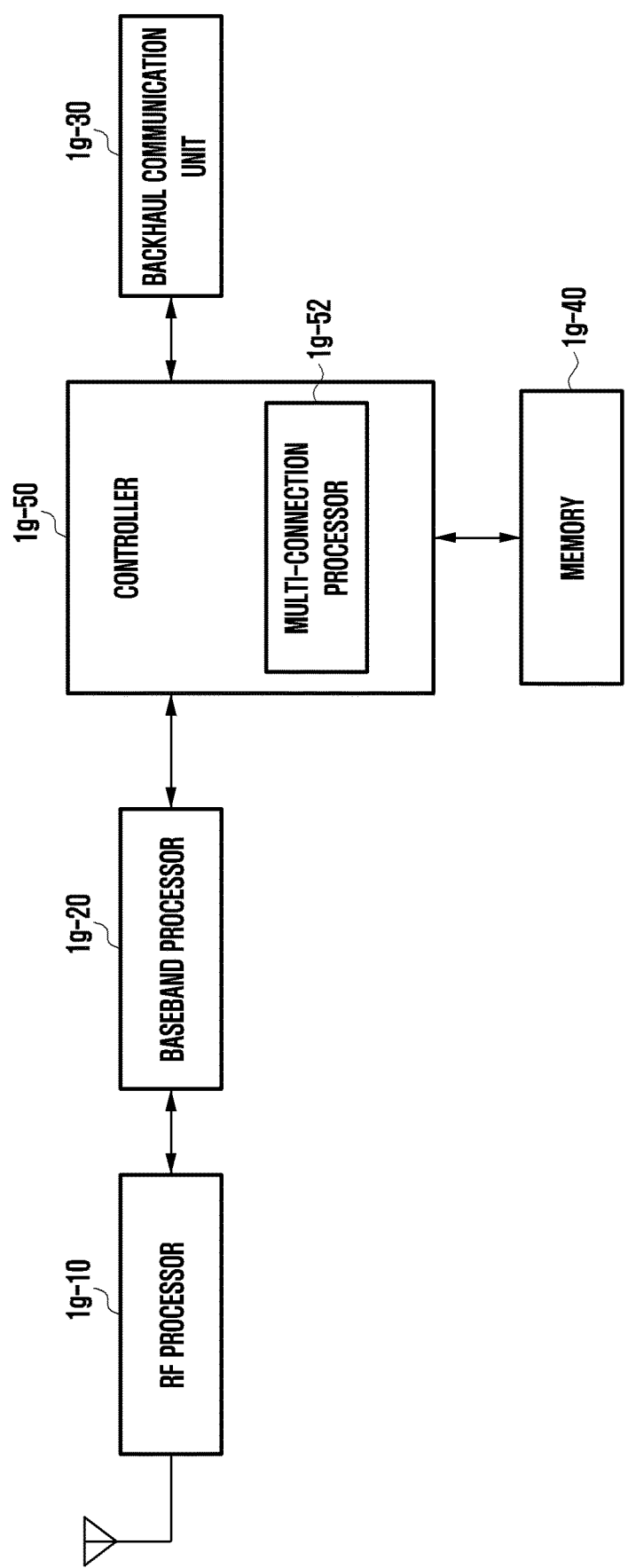
FIG. 1G is a block diagram illustrating the configuration of a node B according to the disclosure.

FIG. 1G illustrates a block configuration of a main node B in a wireless communication system according to an embodiment.

As illustrated in the diagram, the node B includes an RF processor 1g-10, a baseband processor 1g-20, a backhaul communication unit 1g-30, a storage unit 1g-40, and a controller 1g-50.

The RF processor 1g-10 is configured to perform functions for transmitting/receiving signals through a radio channel, such as signal band conversion and amplification. That is, the RF processor 1g-10 up-converts a baseband signal provided from the baseband processor 1g-20 to an RF band signal, transmits the same through an antenna, and down-converts an RF band signal received through the antenna to a baseband signal. For example, the RF processor 1g-10 may include a transmitting filter, a receiving filter, an amplifier, a mixer, an oscillator, a DAC, an ADC, and the like. Although only one antenna is illustrated in the diagram, the first access node may include multiple antennas. In addition, the RF processor 1g-10 may include multiple RF chains. Moreover, the RF processor 1g-10 may perform beamforming. For the purpose of beamforming, the RF processor 1g-10 may adjust the phase and magnitude of respective signals transmitted/received through multiple antennas or antenna elements. The RF processor may perform a downward MIMO operation by transmitting at least one layer.

The baseband processor 1g-20 is configured to perform a function for conversion between a baseband signal and a bit string according to the physical layer specification of the first radio access technology. For example, during data transmission, the baseband processor 1g-20 generates complex symbols by encoding and modulating a transmission bit string. In addition, during data reception, the baseband processor 1g-20 restores a reception bit string by demodulating and decoding a baseband signal provided from the RF processor 1g-10. For example, if an OFDM scheme is followed, and during data transmission, the baseband processor 1g-20 generates complex symbols by encoding and modulating a transmission bit string, maps the complex symbols to subcarriers, and then configures OFDM symbols through IFFT operation and CP insertion. In addition, during data reception, the baseband processor 1g-20 divides a baseband signal provided from the RF processor 1g-10 symbol by symbol, restores signals mapped to subcarriers through a fast Fourier transform (FFT) operation, and then restores the reception bit string through demodulation and decoding. The baseband processor 1g-20 and the RF processor 1g-10 transmit and receive signals as described above. Accordingly, the baseband processor 1g-20 and the RF processor 1g-10 may be referred to as transmitting units, receiving units, transceivers, or communication units.

The backhaul communication unit 1g-30 is configured to provide an interface for communicating with other nodes in the network. That is, the backhaul communication unit 1g-30 converts a bit string transmitted from the main node B to another node (for example, auxiliary node B, core network, or the like) to a physical signal, and converts a physical signal received from the other node to a bit string.

The storage unit 1g-40 is configured to store data for operations of the node B, such as basic programs, application programs, and configuration information. Particularly, the storage unit 1g-40 may store information regarding a bearer assigned to an accessed UE, a measurement result reported by the access UE, and the like. In addition, the storage unit 1g-40 may store information serving as a reference to determine whether to provide the UE with multi-connection or to abort the same. In addition, the storage unit 1g-40 provides stored data at the request of the controller 1g-50.

The controller 1g-50 is configured to control overall operations of the main node B. For example, the controller 1g-50 transmits/receives signals through the baseband processor 1g-20 and the RF processor 1g-10 or through the backhaul communication unit 1g-30. In addition, the controller 1g-50 records and reads data in the storage unit 1g-40. To this end, the controller 1g-50 may include at least one processor.

Second Embodiment

Figure 2A:
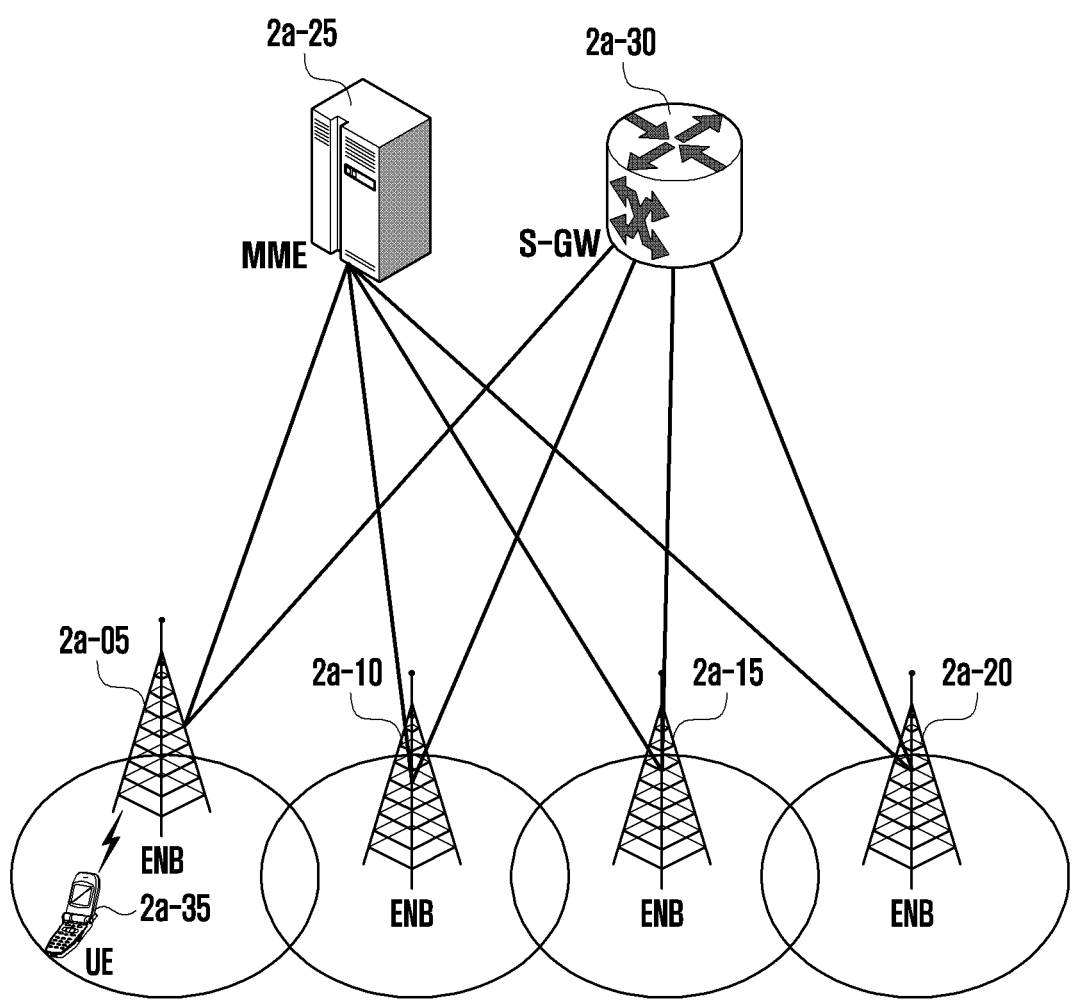
FIG. 2A is a diagram illustrating the structure of an LTE system to which the disclosure is applicable.

FIG. 2A is a diagram illustrating the structure of an LTE system to which the disclosure is applicable.

Referring to FIG. 2A, the radio access network of the LTE system includes, as illustrated, evolved nodes B (hereinafter, referred to as ENBs, nodes B, or base stations) 2a-05, 2a-10, 2a-15, and 2a-20, a mobility management entity (MME) 2a-25, and a serving-gateway (S-GW) 2a-30. A user equipment (hereinafter, referred to as UE or terminal) 2a-35 accesses an external network through the ENBs 2a-05 to 2a-20 and the S-GW 2a-30.

In FIG. 2A, the ENBs 2a-05 to 2a-20 correspond to existing nodes B of a UMTS system. The ENBs are connected to the UE 2a-35 through a radio channel, and play more complicated roles than those of existing nodes B. Since all user traffic, including a real-time service such as voice over IP (VoIP) through an Internet protocol, is provided through a shared channel in the LTE system, a device for aggregating and scheduling state information of the UEs, such as the buffer state, the available transmission power state, and the channel state, is necessary, and the ENBs 2a-05 to 2a-20 are in charge thereof. A single ENB normally controls multiple cells. In order to implement a transmission rate of 100 Mbps, for example, the LTE system uses orthogonal frequency division multiplexing (hereinafter, referred to as OFDM) as a radio access technology in a bandwidth of 20 MHz, for example. In addition, the modulation scheme and the channel coding rate are determined according to the UE's channel state (that is, adaptive modulation & coding (hereinafter, referred to as AMC) scheme is applied). The S-GW 2a-30 is a device configured to provide a data bearer, and generates or removes a data bearer under the control of the MME 2a-25. The MME is a device handling not only a mobility management function regarding the UE, but also various control functions, and is connected to multiple nodes B.

Figure 2B:
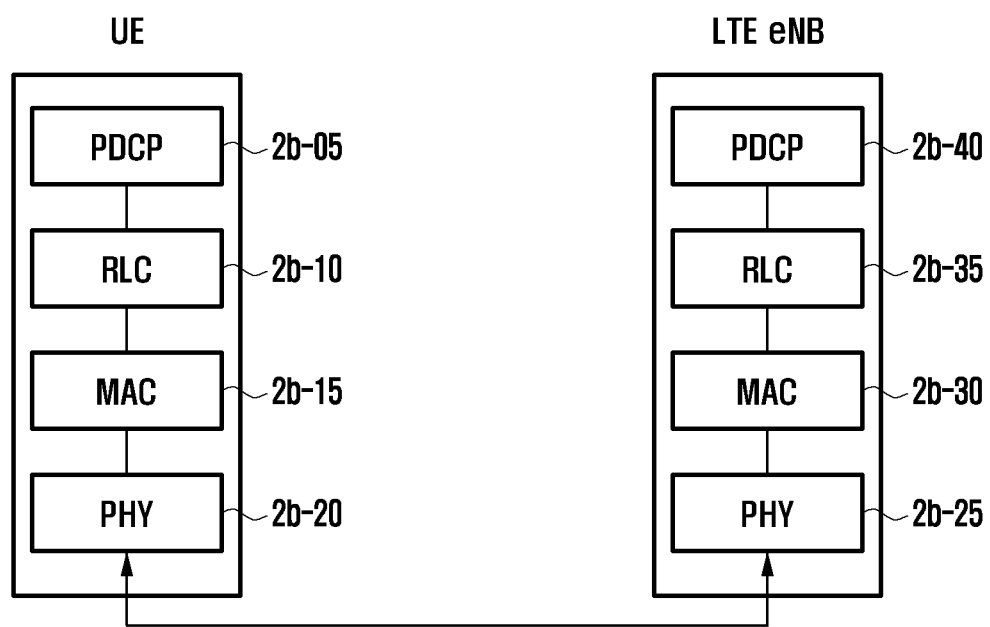
FIG. 2B is a diagram illustrating a radio protocol structure in connection with an LTE system to which the disclosure is applicable.

FIG. 2B is a diagram illustrating a radio protocol structure in connection with an LTE system to which the disclosure is applicable.

Referring to FIG. 2B, the radio protocol of the LTE system includes packet data convergence protocols (PDCPs) 2b-5 and 2b-40, radio link controls (RLCs) 2b-10 and 2b-35, and medium access controls (MACs) 2b-15 and 2b-30, on the UE side and on the ENB side, respectively. The PDCPs 2b-05 and 2b-40 are in charge of operations such as IP header compression/restoration. Major functions of the PDCPs are summarized as followed:
Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM)

Ciphering and deciphering

Timer-based SDU discard in uplink.

The radio link controls (RLCs) 2b-10 and 2b-35 are configured to reconfigure a PDCP packet data unit (PDU) into an appropriate size and to perform an ARQ operation and the like. Major functions of the RLCs are summarized as follows:

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 2b-15 and 2b-30 are connected to multiple RLC layer devices configured in a single UE so as to perform operations of multiplexing RLC PDUs to a MAC PDU and demultiplexing the RLC PDUs form the MAC PDU. Major functions of the MACs are summarized as follows:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding The physical layers 2b20 and 2b-25 are configured to perform operations of channel-coding and modulating upper-layer data, generating an OFDM symbol therefrom, and transmitting the same through a radio channel, or demodulating an OFDM symbol received through the radio channel, channel-decoding the same, and delivering the same to the upper layer.

Figure 2C:
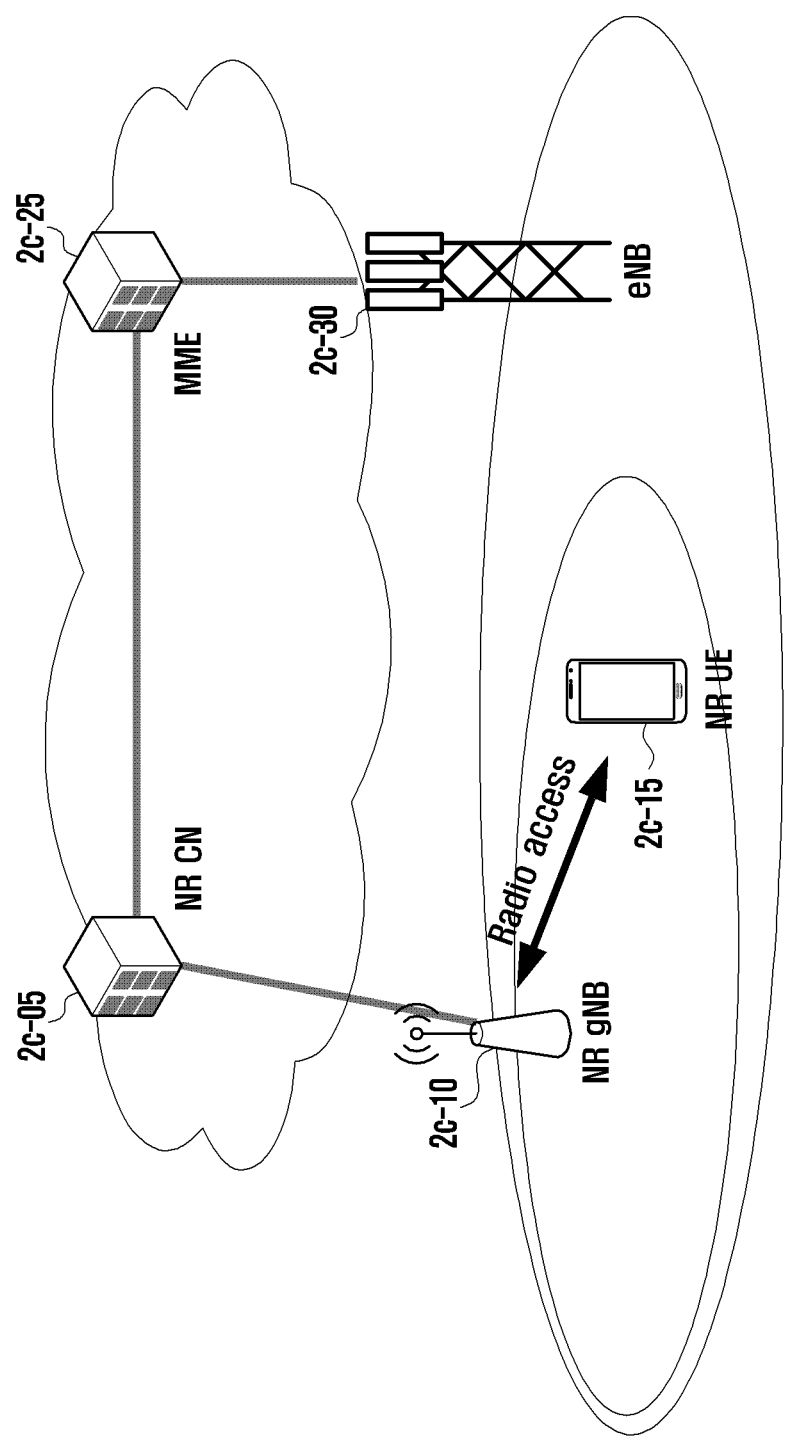
FIG. 2C is a diagram illustrating the structure of an NR mobile communication system to which the disclosure is applicable.

FIG. 2C is a diagram illustrating the structure of an NR mobile communication system to which the disclosure is applicable.

Referring to FIG. 2C, the radio access network of the new radio (hereinafter, referred to as NR or 5G) mobile communication system includes, as illustrated, a new radio node B (hereinafter, referred to as NR gNB or NR base station) 2c-10 and a new radio core network (NR CN) 2c-05. A new radio user equipment (hereinafter, referred to as NR UE or UE) 2c-15 accesses an external network through the NR gNB 2c-10 and the NR CN 2c-05.

In FIG. 2C, the NR gNB 2c-10 corresponds to an evolved node B (eNB) of an existing LTE system. The NR gNB is connected to the NR UE 2c-15 through a radio channel, and may provide a better service than any existing node B. Since all user traffic is provided through a shared channel in the NR mobile communication system, a device for aggregating and scheduling state information of the UEs, such as the buffer state, the available transmission power state, and the channel state, is necessary, and the NR gNB 2c-10 is in charge thereof. A single NR gNB normally controls multiple cells. In order to implement high-speed data transmission compared with the existing LTE, the NR gNB may have a maximum bandwidth equal to or larger than the existing one, may employ orthogonal frequency division multiplexing (hereinafter, referred to as OFDM) as a radio access technology, and may additionally employ a beamforming technology in combination. In addition, the modulation scheme and the channel coding rate are determined according to the UE's channel state (that is, adaptive modulation & coding (hereinafter, referred to as AMC) scheme is applied). The NR CN 2c-05 performs functions such as mobility support, bearer configuration, and QoS configuration. The NR CN is a device handling not only a mobility management function regarding the UE, but also various control functions, and is connected to multiple nodes B. In addition, the NR mobile communication system may interwork with an existing LTE system, and the NR CN is connected to an MME 2c-25 through a network interface. The MME is connected to an eNB 2c-30 (existing node B).

Figure 2D:
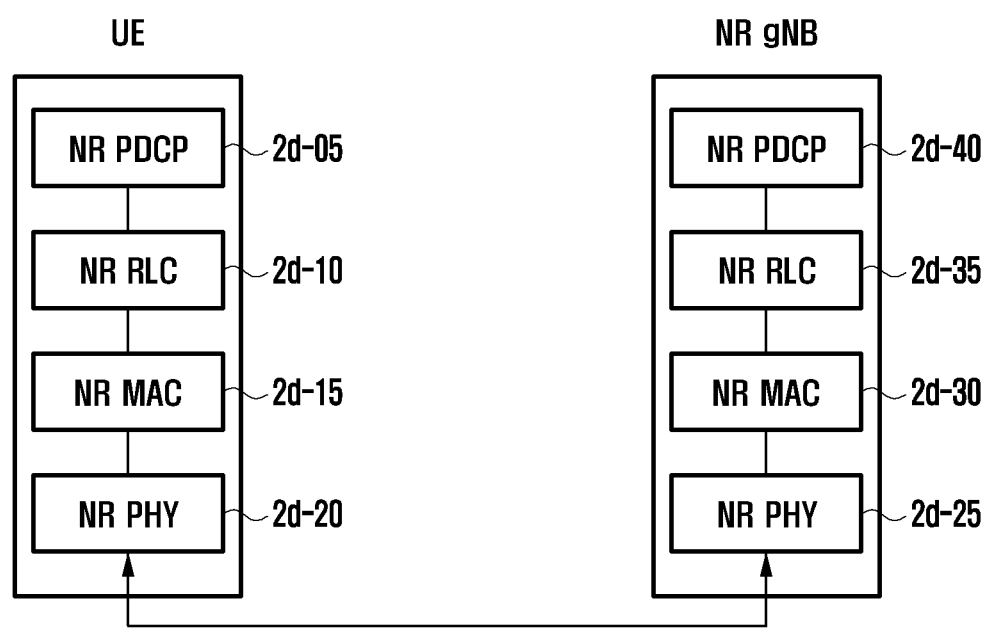
FIG. 2D is a diagram illustrating a radio protocol structure in connection with an NR mobile communication system to which the disclosure is applicable.

FIG. 2D is a diagram illustrating a radio protocol structure of an NR mobile communication system to which the disclosure is applicable.

Referring to FIG. 2D, the radio protocol of the NR mobile communication system includes NR PDCPs 2d-05 and 2d-40, NR RLCs 2d-10 and 2b-35, and NR MACs 2d-15 and 2d-30, on the UE side and on the NR gNB side, respectively. Major functions of the PDCPs 2d-05 and 2d-40 may include some of the following functions:

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

The above-mentioned reordering function of the NR PDCPs refers to a function of reordering PDCP PDUs received from the lower layer based on the PDCP sequence number (SN), and may include a function of delivering reordered data to the upper layer. Alternatively, the reordering function may include a function of instantly delivering data without considering the order, a function of recording PDCP PDUs lost as a result of reordering, a function of reporting the state of the lost PDCP PDUs to the transmitting side, and a function of requesting retransmission of the lost PDCP PDUs.

Major functions of the NR RLCs 2d-10 and 2d-35 may include some of the following functions:

Transfer of upper layer PDUs

In-sequence delivery of upper layer PDUs (Out-of-sequence delivery of upper layer PDUs Error Correction through ARQ Concatenation, segmentation and reassembly of RLC SDUs Re-segmentation of RLC data PDUs Reordering of RLC data PDUs Duplicate detection Protocol error detection RLC SDU discard RLC re-establishment.

The above-mentioned in-sequence delivery function of the NR RLC devices refer to a function of delivering RLC SDUs received from the lower layer to the upper layer in a sequence. If a single RLC SDU has been divided into multiple RLC SDUs, which are then received, a function of reassembling and delivering the same may be included. The in-sequence delivery function may include a function of reordering received RLC PDUs with reference to an RLC sequence number (SN) or a PDCP SN, a function of recording RLC PDUs lost as a result of reordering, a function of reporting the state of the lost RLC PDUs to the transmitting side, and a function of requesting retransmission of the lost RLC PDUs. If there is a lost RLC SDU, the in-sequence delivery function may include a function of delivering only RLC SDUs preceding the lost RLC SDU to the upper layer in a sequence. Alternatively, even if there is a lost RLC SDU, and if a predetermined timer has expired, the in-sequence delivery function may include a function of delivering all RLC SDUs received before the timer has started to the upper layer in a sequence. Alternatively, even if there is a lost RLC SDU, and if a predetermined timer has expired, the in-sequence delivery function may include a function of delivering all currently-received RLC SDU. In addition, the above-mentioned RLC PDUs may be processed in the received order (in the arriving order, regardless of the order of the sequence number), and then delivered to the PDCP regardless of the sequence (out-of-sequence delivery). In the case of segments, segments stored in the buffer or segments to be received later may be received, reconfigured into a single complete RLC PDU, processed, and delivered to the PDCP devices. The NR RLC layer may not include a concatenation function, which may then be performed by the NR MAC layer or replaced with a multiplexing function of the NR MAC layer.

The above-mentioned out-of-sequence delivery function of the NR RLC devices refers to a function of instantly delivering RCL SDUs received from the lower layer to the upper layer regardless of the sequence. If a single RLC SDU has been divided into multiple RLC SDUs, which are then received, a function of reassembling and delivering the same may be included. The out-of-sequence delivery function may also include a function of storing the RLC SN or PDCP SN of received RLC PDUs, and recording RLC PDUs lost as a result of reordering.

The NR MACs 1*d*-15 and 2*d*-30 may be connected to multiple NR RLC layer devices configured in a single UE, and major functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2*d*-20 and 2*d*-25 may perform operations of channel-coding and modulating upper-layer data, generating an OFDM symbol therefrom, and transmitting the same through a radio channel, or demodulating an OFDM symbol received through the radio channel, channel-decoding the same, and delivering the same to the upper layer.

The disclosure proposes a method for effectively supporting many UEs if a substantially wide bandwidth is used as the entire system bandwidth in an NR mobile communication system. The frequency bandwidth that each UE can read and interpret may differ depending on the capability or category of the UE. Accordingly, during the initial access, a UE may report the capability of the UE to a network or a node B through an RRC message. After learning the capability of the UE from the RRC message, the node B may configure a bandwidth part (BWP) in accordance therewith. For example, if the capability of the UE supports up to 20 Mhz, the node B may assign a BWP of 10 Mhz such that, by assigning a small frequency bandwidth that the UE needs to read, battery power consumption can be reduced. In the case of a service requiring a large amount of data transmission, a maximum bandwidth of 20 Mhz may be assigned, thereby supporting a high transmission rate. In addition, the UE-specific capability may be identified, in connection with the entire system bandwidth, and BWPs having different widths and different time/frequency resources may be assigned accordingly such that the node B can support various UEs.

Figure 2E:
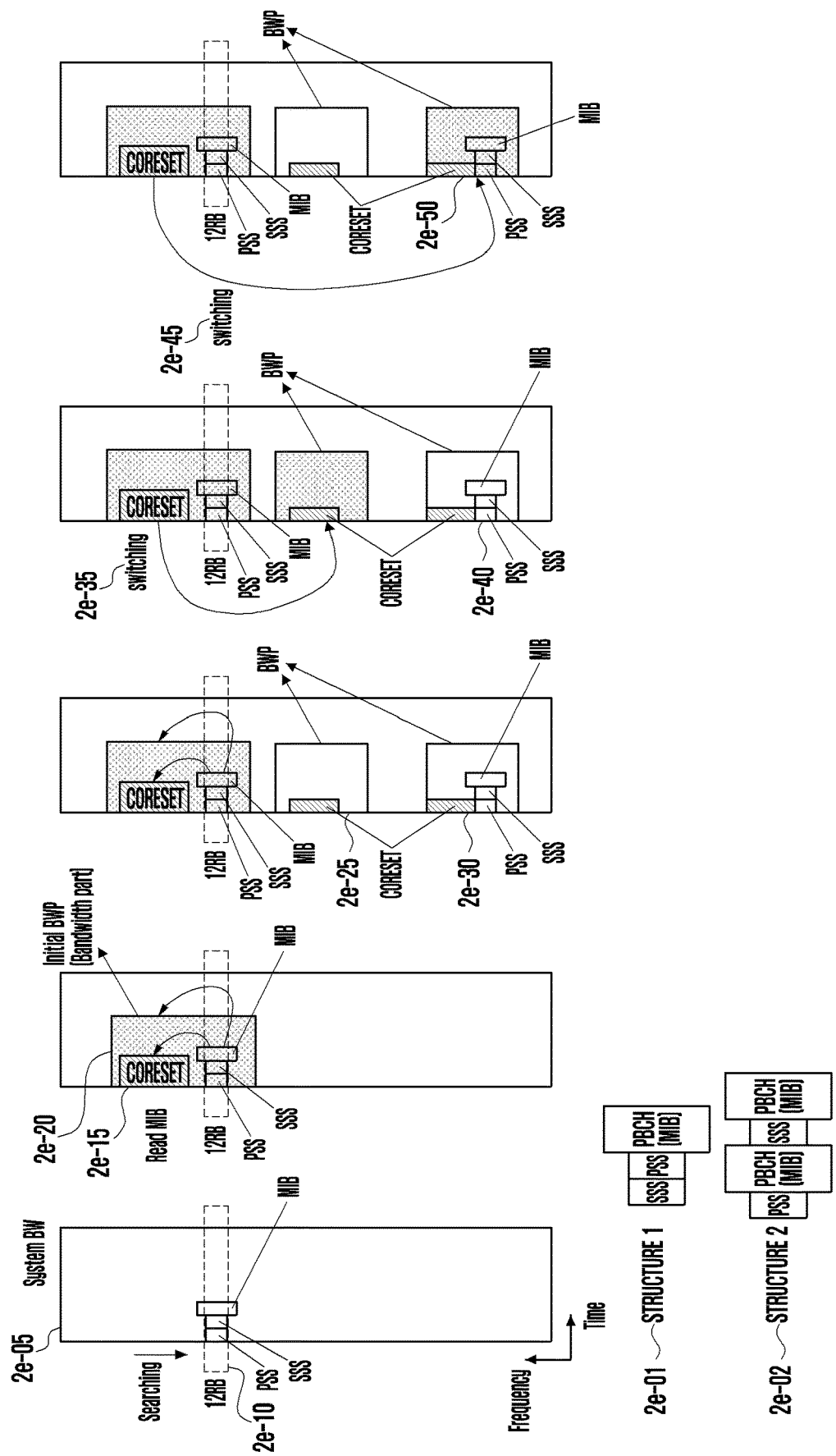
FIG. 2E is a diagram illustrating a procedure for providing a service to a UE by effectively using a substantially wide frequency bandwidth in an NR mobile communication system according to the disclosure.

FIG. 2E is a diagram illustrating a procedure for providing a service to a UE by effectively using a substantially wide frequency bandwidth in an NR mobile communication system according to the disclosure.

FIG. 2E illustrates how an NR mobile communication system can effectively use a substantially wide frequency bandwidth to provide a service to UEs having different capabilities or categories and to reduce battery power consumption.

A single cell which receives a service from the node B may have a substantially wide frequency band available for the service, as in 2*e*-05. Initially, the UE may search through the entire frequency band provided by the business provider (PLMN) in a predetermined resource block unit (for example, 12 resource block (RB) unit). That is, the UE may start searching for a primary synchronization sequence (PSS)/secondary synchronization sequence (SSS), based on the RB unit, in the entire system bandwidth (2*e*-10). If the signals are detected while searching for the PSS/SSS in the RB unit, the signals may be read and interpreted (decoded) so as to identify the boundary between a subframe and a radio transport resource frame. Accordingly, a subframe can be distinguished in a 1 ms unit, and a downlink signal is synchronized with the node B. The above-mentioned resource block (RB) is a size of a predetermined frequency resource and a predetermined time resource, and may be defined in terms of a two-dimensional unit. For example, the same may be defined in terms of 1 ms unit (time resource) and twelve subcarriers (frequency resource) (1 carrier×15 kHz=180 kHz). If the synchronization is completed, the UE may check the master system information block (MIB) or minimum system information (MSI) so as to identify control resource set (CORESET) information and initial access bandwidth part (also referred to as BWP or default BWP) information (2*e*-15 and 2*e*-20). The CORESET information refers to the position of a time/frequency transport resource used to transmit a control signal from the node B and, for example, indicates the position of a resource used to transmit a PDCCH channel. The initial access BWP information refers to information regarding the minimum bandwidth that the UE needs to be able to read or needs to support. Alternatively, in the CORESET, a control signal may determine and indicate the position of a transport resource for transmitting data within the initial BWP (for example, the position of a PDCCH may be indicated). The initial BWP may be transmitted inside the MIB or MSI, and may also be determined as the minimum bandwidth that the UE supports. If the UE completes synchronization of a downlink signal with the node B and thus becomes able to receive a control signal, then the UE may perform a random access procedure, receive a random access response, request an RRC connection configuration, receive an RRC message, and perform an RRC connection configuration.

The RRC connection configuration may be configured by an RRC connection reconfiguration message, which may configure multiple dedicated BWPs (if multiple BWPs are configured, the message may include an indicator that indicates which BWP is a default BWP, thereby indicating the default BWP). Alternatively, it is possible to configure a BWP to be used if the UE re-accesses in an inactive mode or in an idle mode (such that fast connection can be made). Configuration information that configures the BWP may include an indicator that indicates whether the BWP is activated or deactivated, may include CORESET information used to transmit a control signal corresponding to the BWP, and may include transport resource information (time/frequency resource) used to transmit an SS block (PSS/SSS) corresponding to the BWP. The above-mentioned default BWP may refer to a BWP that the UE needs to activate always, or may be used to fall back such that, if another bandwidth has a connection failure or a broken link, reconnection can be attempted. In addition, the BWP configuration information may include information regarding a new BWP to which a UE currently reading an initial access BWP needs to move, and may include information that instructs a BWP change to the new BWP (since the initial BWP may be used by many UEs during the initial access, the same may be moved to a dedicated BWP and managed accordingly after the connection is completed).

In addition, the RRC connection configuration information may be used to configure frequency measurement configuration information, frequency measurement gap information, and the like, and may include frequency measurement object information. The frequency measurement report object may include BWP information having a reference signal (RS)/synchronization signal (SS) for measurement configured therein, and may include a center frequency, a bandwidth corresponding to the BWP, a time pattern to be applied during measurement, and the like. The measurement report gap information may include a measurement gap length corresponding to a time interval for which measurement is to be made, a measurement gap period, and measurement gap starting timepoint information. The above-mentioned RS refers to a signal transmitted from the node B with a partial time/frequency pattern in a transport resource of a subframe used to transmit a control signal or a data signal, and may be used to determine the signal intensity in the corresponding BWP or corresponding cell. The above-mentioned SS signal refers to a synchronization signal transmitted periodically, as in the case of the PSS or SSS, and may also be used to determine the signal intensity in the corresponding BWP or corresponding cell.

After the RRC connection configuration is completed as described above, the UE may configure multiple BWPs according to the instruction configured by the RRC message (2e-25 and 2e-30). In addition, the UE may activate one or a small number of bandwidths among the multiple configured BWPs, in order to reduce battery power consumption. For example, the UE may indicate one BWP to activate. In addition, the node B may instruct activation of a BWP by using an RRC message or MAC control information (MAC CE) (for example, bitmap information may be used to instruct whether to activate or to deactivate) or through L1 signaling (PHY layer control signal such as PDCCH), thereby instructing switching from the initial access BWP to a new BWP (2e-35 and 2e-40). Since a large number of newly accessing users may exist in the initial access BWP, it may be quite advantageous in terms of scheduling to assign a new BWP and to separately manage the connected users. This is because the initial access BWP is not configured for each UE, but may be shared and commonly used by all UEs.

When the UE switches to a new BWP as described above (meaning a change in the range of the bandwidth in which the UE is to read a control signal and a data signal by using a frequency/time resource), the new BWP may correspond to a bandwidth used to transmit a PSS/SSS or RS/SS (that is, bandwidth through which the PSS/SSS or RS/SS is transmitted inside the BWP), or may correspond to a BWP not used to transmit the PSS/SSS or RS/SS (2e-40 and 2e-50). The structure of the PSS/SSS mentioned above may be identical to the first structure (2e-01) or the second structure (2e-02).

The disclosure has proposed a scheme wherein a substantially wide frequency band is defined by introducing a new concept of "BWP", and is configured through an RRC message, multiple UEs are supported effectively, and battery power consumption can be reduced, as described above. Next, a method for efficiently making a frequency measurement report, by a UE, in a BWP will be proposed. Particularly, a scheme for activating frequency measurement according to whether or not an RS/SS or PSS/SSS signal is included in a BWP, is proposed. This ensures that, if a UE receives a service through a BWP having no RS/SS or PSS/SSS included therein, a preconfigured different BWP is simultaneously measured, thereby enabling fast switching to a new BWP.

A first embodiment of the frequency measurement report method proposed in the disclosure is as follows:

The UE activates a frequency measurement gap if there exists an inter-frequency measurement configuration, if any, among configured measurement report information or measurement report gap information. The inter-frequency measurement may refer to measuring a frequency with regard to a cell other than the serving cell of the UE.

The UE activates a measurement report gap if intra-frequency measurement is solely configured among the configured measurement report information, and if the serving BWP currently used to receive a service includes no frequency band having an RS/SS or PSS/SSS signal for measurement configured therein. The intra-frequency measurement may refer to measuring a frequency with regard to the serving cell of the UE.

The UE deactivates the measurement report gap if intra-frequency measurement is solely configured among the configured measurement report information, and if the serving BWP currently used to receive a service includes a frequency band having an RS/SS or PSS/SSS signal for measurement configured therein.

If an RS/SS or PSS/SSS signal is configured with regard to the serving BWP, signal intensity measurement is instantly possible inside the bandwidth used to receive the service. On the other hand, if the RS/SS or PSS/SSS signal is configured outside the serving BWP, signal intensity measurement needs to be performed with a predetermined time interval. Accordingly, if the measurement report gap is activated to report measurement with regard to a BWP to which a movement may occur later, and to report the same to the node B, fast BWP switching is possible later.

Figure 2F:
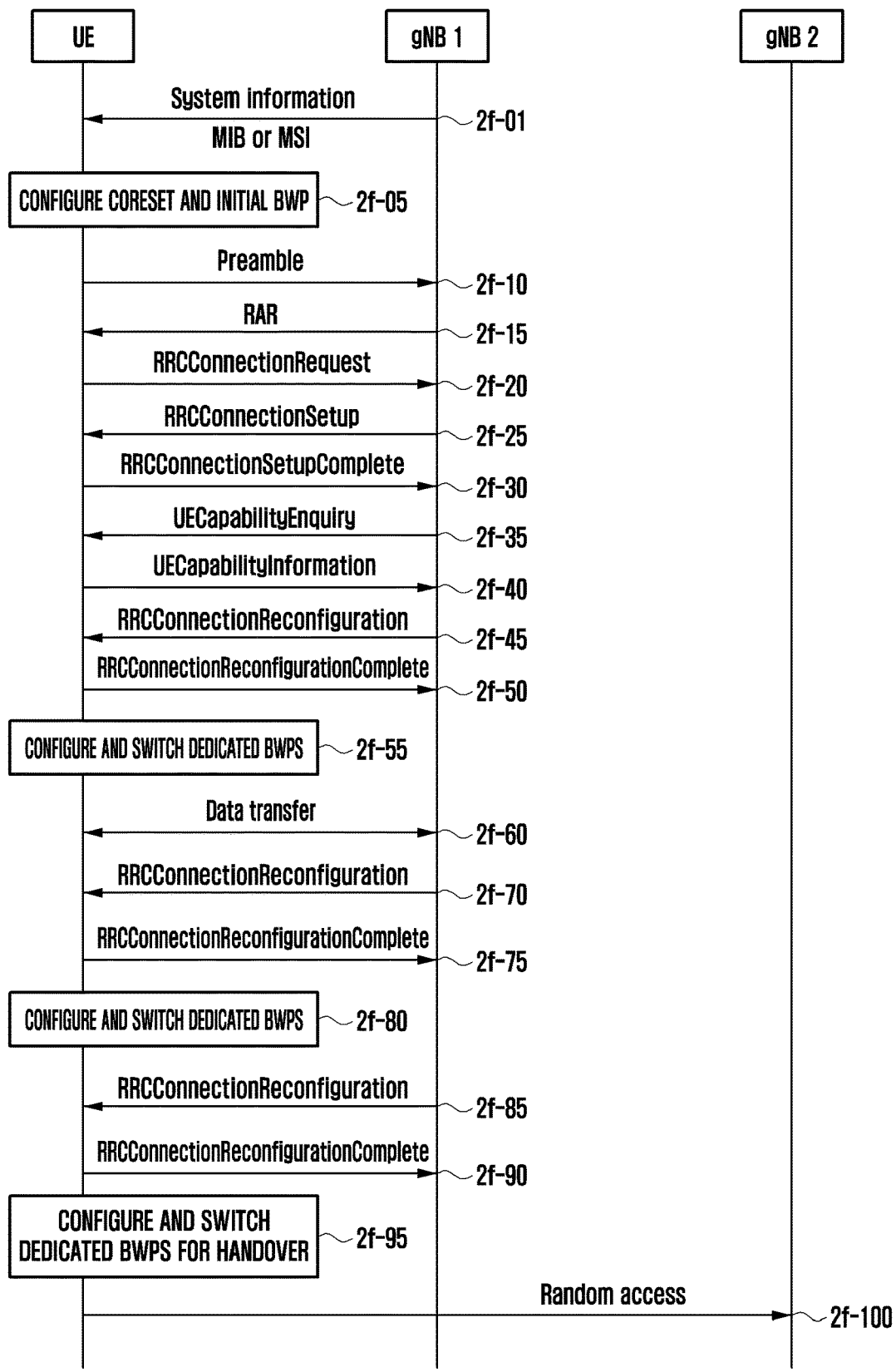
FIG. 2F is a diagram illustrating a network connection configuration procedure proposed for a UE to switch from an RRC idle mode to an RRC connected mode and to configure a bandwidth part in an NR mobile communication system according to the disclosure.

FIG. 2F is a diagram illustrating a network connection configuration procedure proposed for a UE to switch from an RRC idle mode to an RRC connected mode and to configure a BWP in an NR mobile communication system according to the disclosure.

A single cell in which a node B provides a service may have a substantially wide frequency band available for the service. Initially, the UE may search through the entire frequency band provided by the business provider (PLMN) in a predetermined resource block unit (for example, 12 resource block (RB) unit). That is, the UE may start searching for a primary synchronization sequence (PSS)/secondary synchronization sequence (SSS), based on the RB unit, in the entire system bandwidth. If the signals are detected while searching for the PSS/SSS in the RB unit, the signals may be read and interpreted (decoded) so as to identify the boundary between a subframe and a radio transport resource frame. Accordingly, a subframe can be distinguished in a 1 ms unit, and a downlink signal is synchronized with the node B. The above-mentioned resource block (RB) is a size of a predetermined frequency resource and a predetermined time resource, and may be defined in terms of a two-dimensional unit. For example, the same may be defined in terms of 1 ms unit (time resource) and twelve subcarriers (frequency resource) (1 carrier×15 kHz=180 kHz). If the synchronization is completed, the UE may read system information of the cell on which the same currently camps. That is, the UE may check the master system information block (MIB) or minimum system information (MSI) so as to identify control resource set (CORESET) information and initial access bandwidth part (BWP) information (2$f$-01). The CORESET information refers to the position of a time/frequency transport resource used to transmit a control signal from the node B and, for example, indicates the position of a resource used to transmit a PDCCH channel. The initial access BWP information refers to information regarding the minimum bandwidth that the UE needs to be able to read or needs to support. Alternatively, in the CORESET, a control signal may determine and indicate the position of a transport resource for transmitting data within the initial BWP (for example, the position of a PDCCH may be indicated). The initial BWP may be transmitted in the MIB or MSI, and may also be automatically determined as the minimum bandwidth that the UE supports. If the UE completes synchronization of a downlink signal with the node B and thus becomes able to receive a control signal, then the UE may configures a CORESET (control signal transport resource) and an initial access bandwidth part (initial BWP) (2$f$-05), may perform a random access procedure, receive a random access response, request an RRC connection configuration, receive an RRC message, and perform an RRC connection configuration (2$f$-10, 2$f$-15, 2$f$-20, 2$f$-25, and 2$f$-30).

After the basic RRC connection configuration is completed, the node B may send an RRC message that asks the UE capability to the UE, in order to identify the UE capability (UECapabilityEnquiry, 2$f$-35). The reason the node B sends an RRC message to the UE to identify the UE capability is for the purpose of identifying the UE capability and then recognizing the extent of the frequency band that the UE can read, for example, or the area of the frequency band that the UE can read. After identifying the UE capability, the node B may configure an appropriate BWP or CORESET for the UE. Upon receiving the RRC message asking the UE capability, the UE may indicate, in response thereto, the range of the bandwidth that the UE supports, the range of the supported bandwidth in the current system bandwidth, or the like by using an offset from a reference center frequency, or the UE may directly indicate the starting point and the last point of the supported frequency bandwidth, or may indicate the center frequency and the bandwidth (2$f$-40).

The BWP may be configured by an RRC connection reconfiguration message of an RRC connection configuration. The message may configure multiple dedicated BWPs (the message may include an indicator that indicates which BWP is a default BWP, among multiple BWPs). Alternatively, it is possible to configure a BWP to be used if the UE re-accesses in an RRC inactive mode or in an RRC idle mode, or to configure a BWP for accessing the target node B during a handover (such that fast connection can be made). Configuration information that configures the BWP may include an indicator that indicates whether the BWP is activated or deactivated, may include CORESET information used to transmit a control signal corresponding to the BWP, and may include transport resource information (time/frequency resource) used to transmit an SS block (PSS/SSS) corresponding to the BWP. The above-mentioned default BWP may refer to a BWP that the UE needs to activate always, or may be used to fall back such that, if another bandwidth has a connection failure or a broken link, reconnection can be attempted. In addition, the BWP configuration information may include information regarding a new BWP to which a UE currently reading an initial access BWP needs to move, and may include information that instructs a BWP change to the new BWP (since the initial BWP may be used by many UEs during the initial access, the same may be moved to a dedicated BWP and managed accordingly after the connection is completed, 2$f$-45). Upon receiving the RRC message, the UE may complete the BWP configuration and may transmit, in response thereto, an RRC connection reconfiguration complete message to the node B. In addition, the UE may switch to a new BWP or CORESET. In addition, the node B and the UE may transmit/receive up/downlink data. According to the amount of data to transmit or the transmission rate, the node B may configure a wider UE BWP (for example, in order to support a larger amount of data transmission) or a narrower BWP (for example, in order to reduce battery power consumption), and may configure the same by sending an RRC message or MAC control information (MAC CE). The MAC control information may define a BWP and instruct activation/deactivation in a bitmap format corresponding thereto, or may specifically indicate a BWP to activate/deactivate (by using an area, a center frequency, a bandwidth, an offset, or the like) (2$f$-70, 2$f$-75, and 2$f$-80). In addition, when performing a handover, the CORESET and the initial access BWP, which are to be used when accessing the target node B, may be indicated and configured in advance by using an RRC message (2$f$-95 and 2$f$-100).

In addition, the RRC connection configuration information may be used to configure frequency measurement configuration information, frequency measurement gap configuration information, and the like, and may include frequency measurement object information. The frequency measurement report object may include BWP information having a reference signal (RS)/synchronization signal (SS) for measurement configured therein, and may include a center frequency, a bandwidth corresponding to the BWP, a time pattern to be applied during measurement, and the like. The measurement report gap information may include a measurement gap length corresponding to a time interval for which measurement is to be made, a measurement gap period, and measurement gap starting timepoint information. The above-mentioned RS refers to a signal transmitted from the node B with a partial time/frequency pattern in a transport resource of a subframe used to transmit a control signal or a data signal, and may be used to determine the signal intensity in the corresponding BWP or corresponding cell. The above-mentioned SS signal refers to a synchronization signal transmitted periodically, as in the case of the PSS or SSS, and may also be used to determine the signal intensity in the corresponding BWP or corresponding cell.

After the RRC connection configuration is completed as described above, the UE may configure multiple BWPs according to the instruction configured by the RRC message. In addition, the UE may activate one or a small number of bandwidths among the multiple configured BWPs, in order to reduce battery power consumption. In addition, the node B may indicate one BWP to activate, to the UE. In addition, the node B may instruct activation of a BWP by using an RRC message or MAC control information (MAC CE) or through L1 signaling (PHY layer control signal such as PDCCH) (for example, bitmap information may be used to instruct whether to activate or to deactivate), thereby instructing switching from the initial access BWP to a new BWP. Since a large number of newly accessing users may exist in the initial access BWP, it may be quite advantageous in terms of scheduling to assign a new BWP and to separately manage the connected users. This is because the initial access BWP is not configured for each UE, but may be shared and commonly used by all UEs. In addition, the default BWP may be indicated dynamically by using the MAC control information, L1 signaling, or system information (in order to reduce signaling overhead).

Figure 2G:
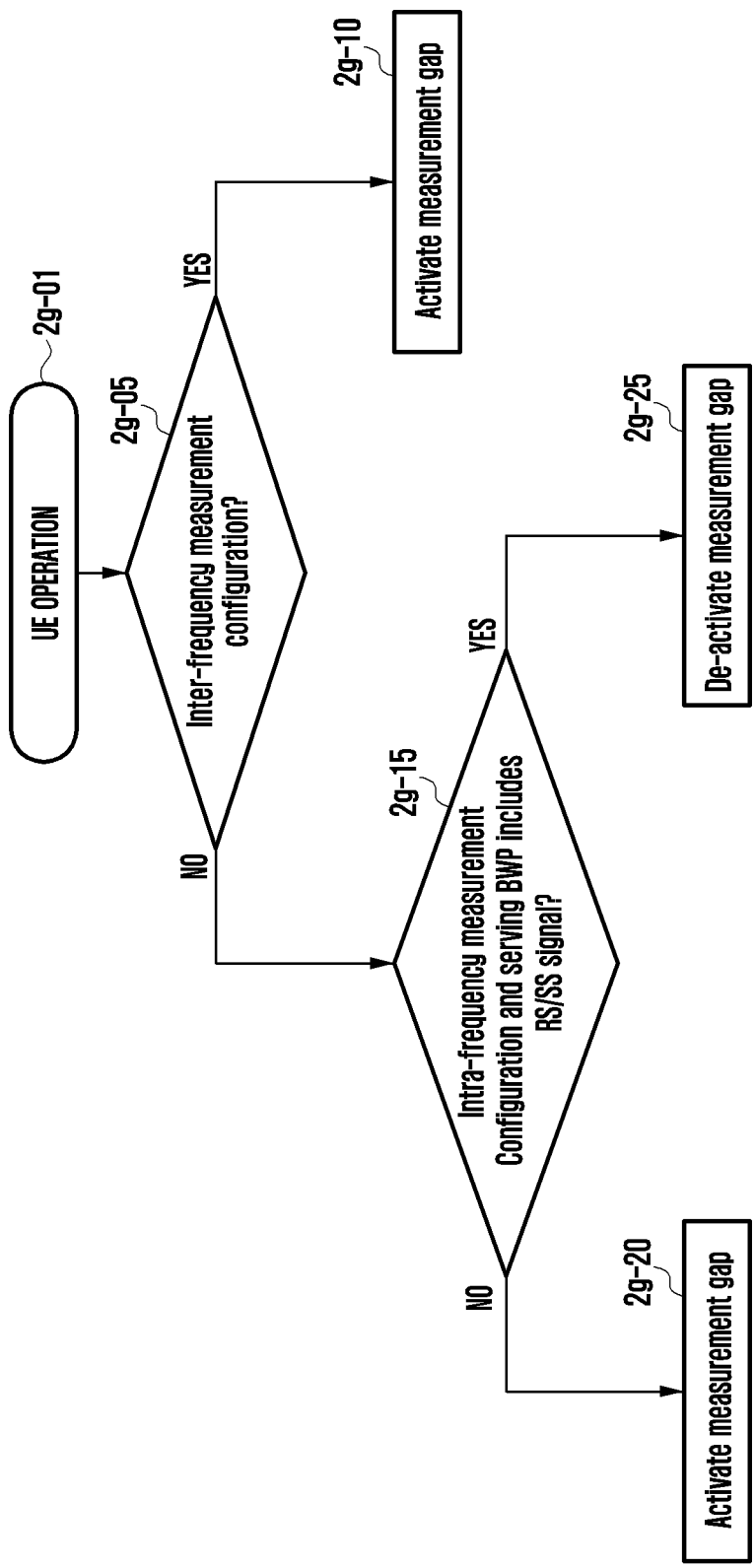
FIG. 2G illustrates UE operations of a method for effectively performing a frequency measurement report in a bandwidth part by a UE configured to use a bandwidth part according to the disclosure.

FIG. 2G illustrates UE operations of a method for effectively performing a frequency measurement report in a bandwidth part by a UE configured to use a bandwidth part according to the disclosure.

Specifically, a scheme for activating frequency measurement according to whether or not an RS/SS or PSS/SSS signal is included in a BWP, is proposed. This ensures that, if a UE receives a service through a BWP having no RS/SS or PSS/SSS included therein, a preconfigured different BWP is simultaneously measured, thereby enabling fast switching to a new BWP.

UE operations of a frequency measurement report method proposed in the disclosure are as follows:

The UE 2g-01 activates a frequency measurement gap (2g-10) if there exists an inter-frequency measurement configuration, if any, among configured measurement report information or measurement report gap information (2g-05).

The UE activates a measurement report gap (2g-20) if there is no inter-frequency measurement configuration (2g-05), if intra-frequency measurement is solely configured among the configured measurement report information, and if the serving BWP currently used to receive a service includes no frequency band having an RS/SS or PSS/SSS signal for measurement configured therein (2g-15).

The UE deactivates the measurement report gap (2g-25) if there is no inter-frequency measurement configuration (2g-05), if intra-frequency measurement is solely configured among the configured measurement report information, and if the serving BWP currently used to receive a service includes a frequency band having an RS/SS or PSS/SSS signal for measurement configured therein (2g-15).

If an RS/SS or PSS/SSS signal is configured with regard to the serving BWP, signal intensity measurement is instantly possible inside the bandwidth used to receive the service. On the other hand, if the RS/SS or PSS/SSS signal is configured outside the serving BWP, signal intensity measurement needs to be performed with a predetermined time interval. Accordingly, if the measurement report gap is activated to report measurement with regard to a BWP to which a movement may occur later, and to report the same to the node B, fast BWP switching is possible later.

The disclosure may be summarized as follows:

<intra-frequency measurement using dynamic measurement gap> configure a measurement gap for intra-frequency enable/disable a measurement gap according to whether or not an RS/SS signal for intra-frequency measurement is in the serving BWP Operations:

1. Indicate CORESET information through MSI, and acquire initial access BWP configuration information 2. Receive an RAR, a contention resolution message, and an RRC connection reconfiguration message through the initial access BWP 3. The RRC connection reconfiguration message includes multi-dedicated BWP configuration information and an indicator indicating activation of a specific BWP 4. If the RRC connection reconfiguration message is received, switch from the initial access BWP to the activated dedicated BWP at a predetermined timepoint 5. Receive measurement configuration information and measurement gap information. The measurement object includes BWP information having an RS/SS for measurement configured therein (center-frequency, bandwidth, time-pattern). The measurement gap configuration information includes a measurement gap length, a measurement gap period, and measurement gap starting timepoint information.

6. The UE activates or deactivates the measurement gap according to the following conditions:

If an inter-frequency measurement exists, if any, among configured measurement, activate the measurement gap;

If intra-frequency is solely configured, and if the serving BWP includes no frequency band having an RS/SS for measurement configured therein, then activate the measurement gap;

If intra-frequency is solely configured, and if the serving BWP includes a frequency band having an RS/SS for measurement configured therein, then deactivate the measurement gap.

Alternatively, the measurement object may be configured for each DL BWP, and multiple measurement objects may be configured for a single carrier frequency.

Figure 2H:
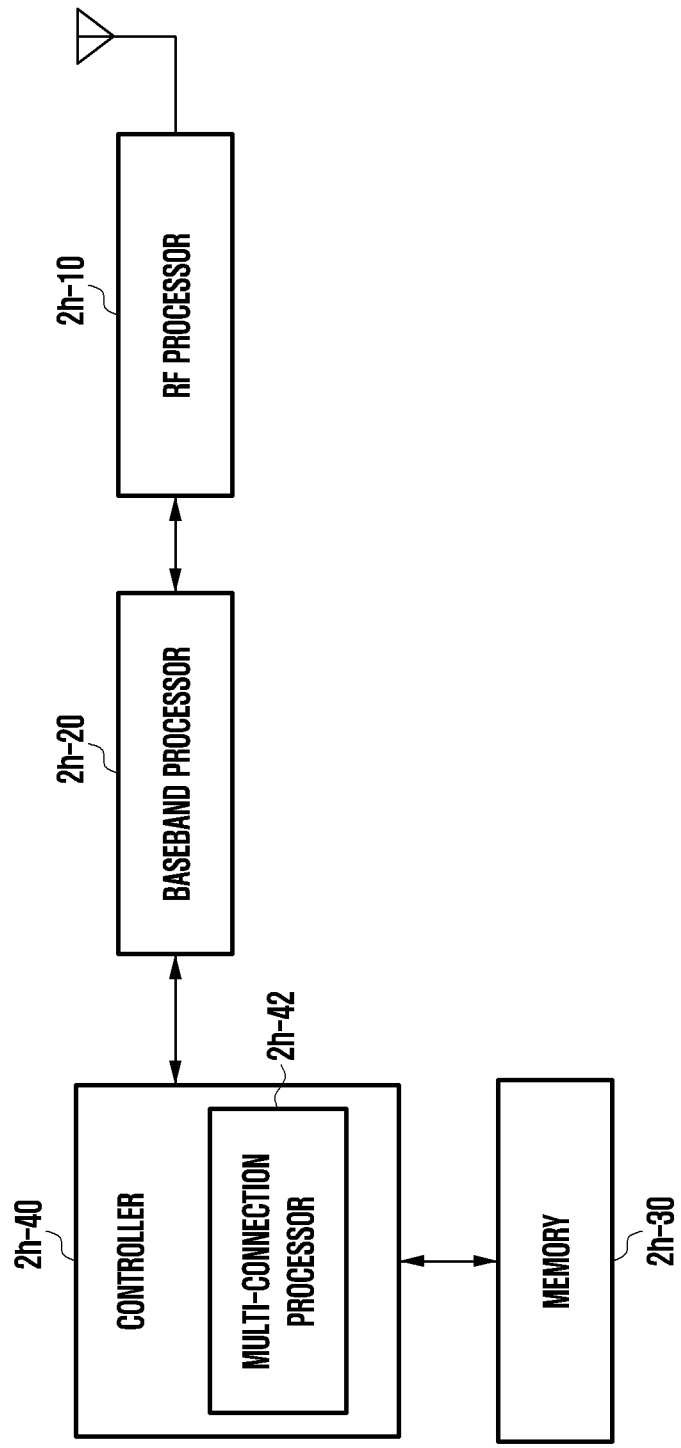
FIG. 2H illustrates the structure of a UE to which an embodiment is applicable.

FIG. 2H illustrates the structure of a UE to which an embodiment is applicable.

Referring to the diagram, the UE includes a radio frequency (RF) processor 2h-10, a baseband processor 2h-20, a storage unit 2h-30, and a controller 2h-40.

The RF processor 2h-10 is configured to perform functions for transmitting/receiving signals through a radio channel, such as signal band conversion and amplification. That is, the RF processor 2h-10 up-converts a baseband signal provided from the baseband processor 2h-20 to an RF band signal, transmits the same through an antenna, and down-converts an RF band signal received through the antenna to a baseband signal. For example, the RF processor 2h-10 may include a transmitting filter, a receiving filter, an amplifier, a mixer, an oscillator, a digital-to-analog convertor (DAC), an analog-to-digital convertor (ADC), and the like. Although only one antenna is illustrated in the diagram, the UE may include multiple antennas. In addition, the RF processor 2h-10 may include multiple RF chains. Moreover, the RF processor 2h-10 may perform beamforming. For the purpose of beamforming, the RF processor 2h-10 may adjust the phase and magnitude of respective signals transmitted/received through multiple antennas or antenna elements. In addition, the RF processor may perform MIMO, and may receive multiple layers when performing the MIMO operation. The RF processor 2h-10 may perform received beam sweeping by appropriately configuring multiple antennas or antenna elements under the control of the controller, or may adjust the direction and width of a received beam such that the received beam is coordinated with a transmitted beam.

The baseband processor 2h-20 is configured to perform a function for conversion between a baseband signal and a bit string according to the physical layer specification of the system. For example, during data transmission, the baseband processor 2h-20 generates complex symbols by encoding and modulating a transmission bit string. In addition, during data reception, the baseband processor 2h-20 restores a reception bit string by demodulating and decoding a baseband signal provided from the RF processor 2h-10. For example, if an orthogonal frequency division multiplexing (OFDM) scheme is followed, and during data transmission, the baseband processor 2h-20 generates complex symbols by encoding and modulating a transmission bit string, maps the complex symbols to subcarriers, and then configures OFDM symbols through inverse fast Fourier transform (IFFT) operation and cyclic prefix (CP) insertion. In addition, during data reception, the baseband processor 2h-20 divides a baseband signal provided from the RF processor 2h-10 symbol by symbol, restores signals mapped to subcarriers through a fast Fourier transform (FFT) operation, and then restores the reception bit string through demodulation and decoding.

The baseband processor 2h-20 and the RF processor 2h-10 transmit and receive signals as described above. Accordingly, the baseband processor 2h-20 and the RF processor 2h-10 may be referred to as transmitting units, receiving units, transceivers, or communication units. Furthermore, at least one of the baseband processor 2h-20 and the RF processor 2h-10 may include multiple communication modules to support multiple different radio access technologies. In addition, at least one of the baseband processor 2h-20 and the RF processor 2h-10 may include different communication modules in order to process signals in different frequency bands. For example, the different radio access technologies may include an LTE network, an NR network, and the like. In addition, the different frequency bands may include a super-high frequency (SHF) (for example, 2.5 GHz or 2 GHz) band and a millimeter wave (for example, 60 GHz) band.

The storage unit 2h-30 is configured to store data for operations of the UE, such as basic programs, application programs, and configuration information. The storage unit 2h-30 provides stored data at the request of the controller 2h-40.

The controller 2h-40 is configured to control overall operations of the UE. For example, the controller 2h-40 transmits/receives signals through the baseband processor 2h-20 and the RF processor 2h-10. In addition, the controller 2h-40 records and reads data in the storage unit 2h-30. To this end, the controller 2h-40 may include at least one processor. For example, the controller 2h-40 may include a communication processor (CP) configured to perform control for communication and an application processor (AP) configured to control an upper layer, such as an application program.

Figure 2I:
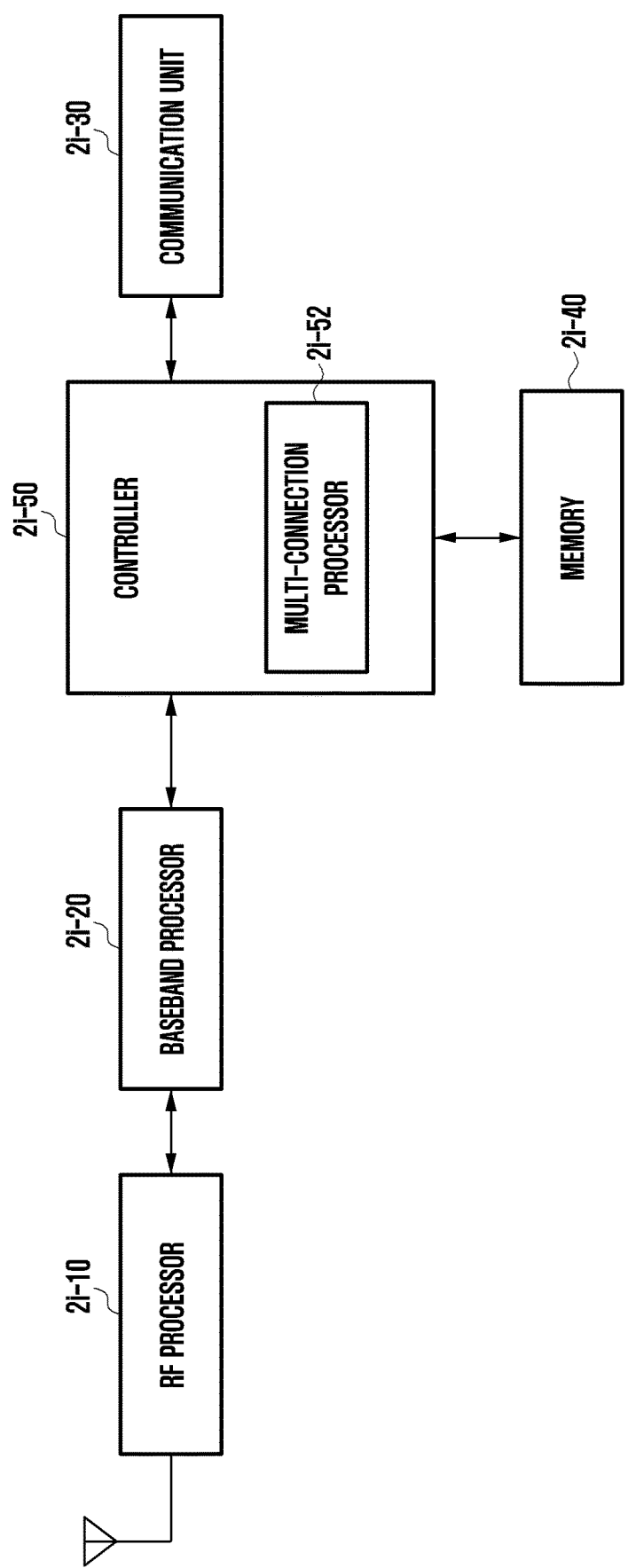
FIG. 2I illustrates a block configuration of a TRP in a wireless communication system to which an embodiment is applicable.

FIG. 2I illustrates a block configuration of a TRP in a wireless communication system to which an embodiment is applicable.

As illustrated in the diagram, the node B includes an RF processor 2i-10, a baseband processor 2i-20, a backhaul communication unit 2i-30, a storage unit 2i-40, and a controller 2i-50.

The RF processor 2i-10 is configured to perform functions for transmitting/receiving signals through a radio channel, such as signal band conversion and amplification. That is, the RF processor 2i-10 up-converts a baseband signal provided from the baseband processor 2i-20 to an RF band signal, transmits the same through an antenna, and down-converts an RF band signal received through the antenna to a baseband signal. For example, the RF processor 2i-10 may include a transmitting filter, a receiving filter, an amplifier, a mixer, an oscillator, a DAC, an ADC, and the like. Although only one antenna is illustrated in the diagram, the first access node may include multiple antennas. In addition, the RF processor 2i-10 may include multiple RF chains. Moreover, the RF processor 2i-10 may perform beamforming. For the purpose of beamforming, the RF processor 2i-10 may adjust the phase and magnitude of respective signals transmitted/received through multiple antennas or antenna elements. The RF processor may perform a downward MIMO operation by transmitting at least one layer.

The baseband processor 2i-20 is configured to perform a function for conversion between a baseband signal and a bit string according to the physical layer specification of the first radio access technology. For example, during data transmission, the baseband processor 2i-20 generates complex symbols by encoding and modulating a transmission bit string. In addition, during data reception, the baseband processor 2i-20 restores a reception bit string by demodulating and decoding a baseband signal provided from the RF processor 2i-10. For example, if an OFDM scheme is followed, and during data transmission, the baseband processor 2i-20 generates complex symbols by encoding and modulating a transmission bit string, maps the complex symbols to subcarriers, and then configures OFDM symbols through IFFT operation and CP insertion. In addition, during data reception, the baseband processor 2i-20 divides a baseband signal provided from the RF processor 2i-10 in an OFDM symbol unit, restores signals mapped to subcarriers through a fast Fourier transform (FFT) operation, and then restores the reception bit string through demodulation and decoding. The baseband processor 2i-20 and the RF processor 2i-10 transmit and receive signals as described above. Accordingly, the baseband processor 2i-20 and the RF processor 2i-10 may be referred to as transmitting units, receiving units, transceivers, or communication units.

The communication unit 2i-30 is configured to provide an interface for communicating with other nodes in the network.

The storage unit 2i-40 is configured to store data for operations of the main node B, such as basic programs, application programs, and configuration information. Particularly, the storage unit 2i-40 may store information regarding a bearer assigned to an accessed UE, a measurement result reported by the access UE, and the like. In addition, the storage unit 2i-40 may store information serving as a reference to determine whether to provide the UE with multi-connection or to abort the same. In addition, the storage unit 2i-40 provides stored data at the request of the controller 2i-50.

The controller 2i-50 is configured to control overall operations of the main node B. For example, the controller 2i-50 transmits/receives signals through the baseband processor 2i-20 and the RF processor 2i-10 or through the backhaul communication unit 2i-30. In addition, the controller 2*i*-50 records and reads data in the storage unit 2*i*-40. To this end, the controller 2*i*-50 may include at least one processor.

Figure 2J:
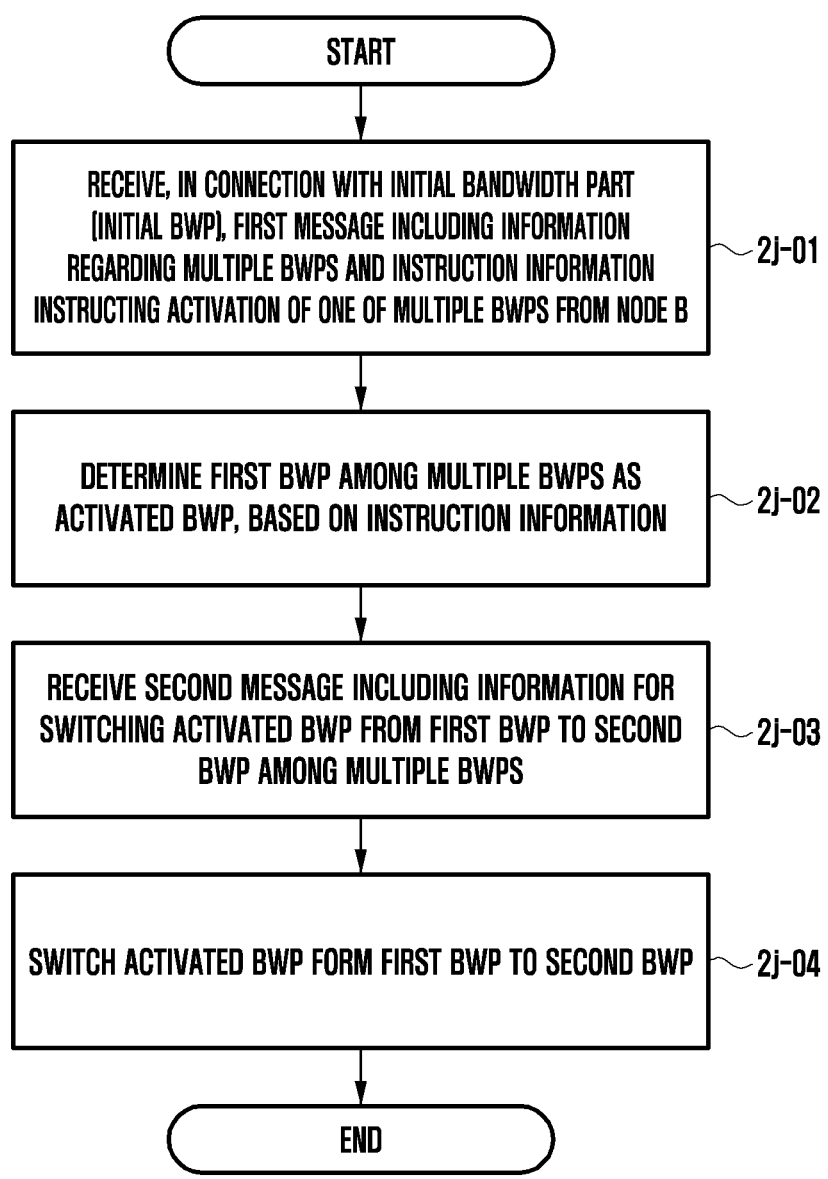
FIG. 2J is a flowchart illustrating a method of a UE according to an embodiment.

FIG. 2J is a flowchart illustrating a method of a UE according to an embodiment. The UE may initially receive, in connection with an initial bandwidth part (initial BWP), a first message including information regarding multiple BWPs and instruction information instructing activation of one of the multiple BWPs, from a node B (2*j*-01). For example, the first message may be an RRC message. The multiple BWPs may be fourth BWPs.

Based on the instruction information, the UE may determine the first BWP among the multiple BWPs as an activated BWP (2*j*-02).

The UE may receive a second message including information for switching the activated BWP from the first BWP to a second BWP among the multiple BWPs (2*j*-03). For example, the information for switching to the second BWP may be transmitted through downlink control information (DCI).

The UE may switch the activated BWP form the first BWP to the second BWP (2*j*-04). For example, the UE may switch the activated BWP form the first BWP to the second BWP after a predetermined time passes since reception of the second message.

Figure 2K:
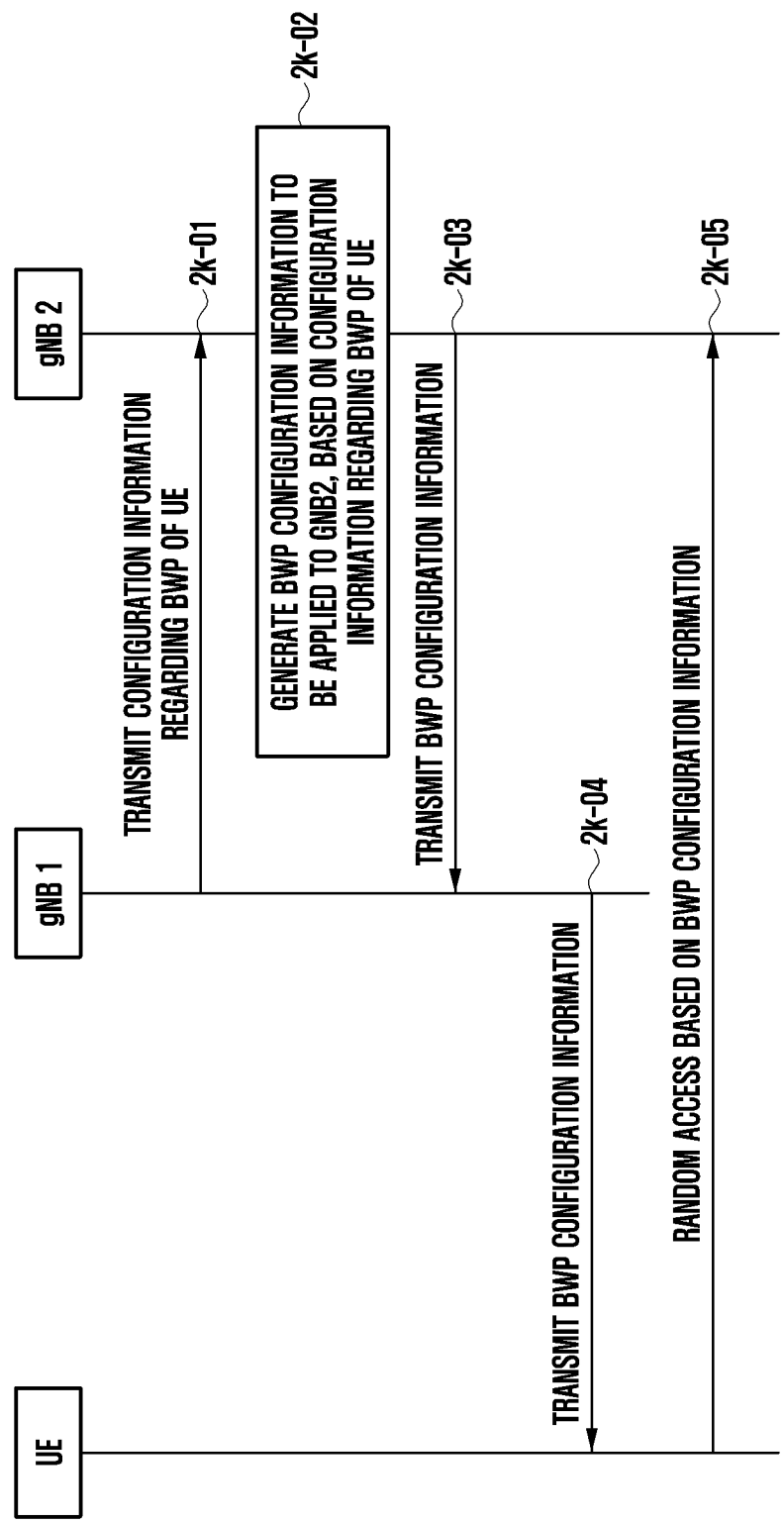
FIG. 2K is a sequence diagram illustrating a method between a UE and nodes B according to an embodiment.

FIG. 2K is a sequence diagram illustrating a method between a UE and nodes B according to an embodiment. The gNB 1 may transmit configuration information regarding the BWP of the UE to the gNB 2 (2*k*-01). For example, if a handover regarding the UE is determined, the gNB 1 may transmit information regarding the BWP capability supported by the UE, or configuration information of the BWP currently applied to the UE, to the gNB 2 (target cell).

The gNB 2 may generate GWP configuration information to be applied in the gNB 2, based on the configuration information regarding the BWP of the UE (2*k*-02). The gNB 2 may transmit the BWP configuration information to the gNB 1 (2*k*-03). For example, in view of the information, the target cell may deliver configuration information of the BWP to be applied in the target cell by the UE, to the gNB 1 (source cell).

After receiving the BWP configuration information to be applied in the gNB 2, the gNB 1 may transmit the BWP configuration information to the UE (2*k*-04). For example, the gNB 1 may transmit the BWP configuration information to the UE by using an RRC control message.

The UE may perform a random access with the gNB 2 based on the BWP configuration information (2*k*-05).

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The invention claimed is:

1. A method of a terminal in a wireless communication system, the method comprising:
   receiving, from a base station on an initial bandwidth part (BWP), a first message comprising first information on multiple BWPs, second information instructing activation of one of the multiple BWPs, frequency measurement configuration information and frequency measurement gap information;
   determining, based on the second information, a first BWP among the multiple BWPs as an activated BWP;
   receiving third information for switching the activated BWP from the first BWP to a second BWP among the multiple BWPs; and
   switching the activated BWP from the first BWP to the second BWP, based on the third information.

2. The method of claim 1, further comprising:
   identifying, based on the frequency measurement configuration information, whether an intra-frequency measurement is configured;
   identifying, in case that the intra-frequency measurement is configured, whether the activated BWP comprises a synchronization signal block (SSB) for measurement;
   deactivating a measurement gap, in case that the activated BWP comprises the SSB for measurement, based on the frequency measurement gap information;
   identifying, based on the frequency measurement configuration information, whether the intra-frequency measurement is configured and in case that the intra-frequency measurement is configured, and the activated BWP comprises no SSB for measurement, activating the measurement gap based on the frequency measurement gap information; and
   identifying, based on the frequency measurement configuration information, whether an inter-frequency measurement is configured and in case that the inter-frequency measurement is configured, activating the measurement gap based on the frequency measurement gap information.

3. The method of claim 1, further comprising:
receiving a second message including BWP configuration information on another base station from the base station, in case that a handover from the base station to the another base station is determined, and the BWP configuration information on the another base station is transmitted from the another base station to the base station.

4. A method of a base station in a wireless communication system, the method comprising:
transmitting, to a terminal on an initial bandwidth part (BWP), a first message comprising first information on multiple BWPs, second information instructing activation of one of the multiple BWPs, frequency measurement configuration information and frequency measurement gap information; and
transmitting, in case that a first BWP among the multiple BWPs is determined by the terminal as an activated BWP based on the second information, third information for switching the activated BWP from the first BWP to a second BWP among the multiple BWPs,
wherein the activated BWP is switched from the first BWP to the second BWP, based on the third information.

5. The method of claim 4, wherein the method further comprises:
receiving, in case that a handover from the base station to another base station is determined, BWP configuration information on the another base station from the another base station, and
transmitting, to the terminal, a second message including BWP configuration information on the another base station;
wherein, whether an intra-frequency measurement is configured is identified by the terminal, based on the frequency measurement configuration information; in case that the intra-frequency measurement is configured, whether the activated BWP comprises a synchronization signal block (SSB) for measurement is identified; in case that the activated BWP comprises the SSB for measurement, the measurement gap is deactivated based on the frequency measurement gap information;
whether an intra-frequency measurement is configured is identified by the terminal, based on the frequency measurement configuration information; in case that the intra-frequency measurement is configured, and the activated BWP comprises no SSB for measurement, the measurement gap is activated based on the frequency measurement gap information;
whether an inter-frequency measurement is configured is identified based on the frequency measurement configuration information; and in case that the inter-frequency measurement is configured, the measurement gap is activated based on the frequency measurement gap information.

6. A terminal in a wireless communication system, the terminal comprising:
a transceiver; and
a controller configured to control the transceiver to receive, from a base station on an initial bandwidth part (BWP), a first message comprising first information on multiple BWPs, second information instructing activation of one of the multiple BWPs, frequency measurement configuration information and frequency measurement gap information, determine, based on the second information, a first BWP among the multiple BWPs as an activated BWP, control the transceiver to receive third information for switching the activated BWP from the first BWP to a second BWP among the multiple BWPs, and control to switch the activated BWP from the first BWP to the second BWP, based on the third information.

7. The terminal of claim 6, wherein the controller is further configured to:
identify, based on the frequency measurement configuration information, whether an intra-frequency measurement is configured;
identify, in case that the intra-frequency measurement is configured, whether the activated BWP comprises a synchronization signal block (SSB) for measurement; and
deactivate a measurement gap, in case that the activated BWP comprises the SSB for measurement, based on the frequency measurement gap information.

8. The terminal of claim 6, wherein the controller is configured to:
identify, based on the frequency measurement configuration information, whether an intra-frequency measurement is configured;
activate a measurement gap based on the frequency measurement gap information, in case that the intra-frequency measurement is configured and the activated BWP comprises no SSB for measurement;
identify, based on the frequency measurement configuration information, whether an inter-frequency measurement is configured; and
activate the measurement gap based on the frequency measurement gap information, in case that the inter-frequency measurement is configured.

9. The terminal of claim 6, wherein the controller is configured to control the transceiver to receive a second message including BWP configuration information on another base station from the base station, in case that a handover from the base station to the another base station is determined, and the BWP configuration information on the another base station is transmitted from the another base station to the base station.

10. A base station in a wireless communication system, the base station comprising:
a transceiver; and
a controller configured to control the transceiver to transmit, to a terminal on an initial bandwidth part (BWP), a first message comprising first information on multiple BWPs, second information instructing activation of one of the multiple BWPs, frequency measurement configuration information and frequency measurement gap information and to transmit third information for switching the activated BWP from the first BWP to a second BWP among the multiple BWPs, in case that a first BWP among the multiple BWPs is determined by the terminal as an activated BWP based on the second information,
wherein the activated BWP is switched from the first BWP to the second BWP, based on the third information.

11. The base station of claim 10, wherein, whether an intra-frequency measurement is configured is identified by the terminal, based on the frequency measurement configuration information; in case that the intra-frequency measurement is configured, whether the activated BWP comprises a synchronization signal block (SSB) for measurement is identified; in case that the activated BWP comprises the SSB for measurement, the measurement gap is deactivated based on the frequency measurement gap information.

12. The base station of claim 10, wherein whether an intra-frequency measurement is configured is identified by the terminal, based on the frequency measurement configuration information; in case that the intra-frequency measurement is configured and the activated BWP comprises no SSB for measurement, the measurement gap is activated based on the frequency measurement gap information, and whether an inter-frequency measurement is configured is identified based on the frequency measurement configuration information; and in case that the inter-frequency measurement is configured, the measurement gap is activated based on the frequency measurement gap information.

13. The base station of claim 10, wherein the controller is configured to control the transceiver receive, in case that a handover from the base station to another base station is determined, BWP configuration information on the another base station from the another base station, and transmit, to the terminal, a second message including BWP configuration information on the another base station.

* * * * *